(12) United States Patent
Yoshida et al.

(10) Patent No.: US 8,188,194 B2
(45) Date of Patent: May 29, 2012

(54) ADHESIVE FOR POLARIZING PLATE AND POLARIZING PLATE HAVING ADHESIVE LAYER

(75) Inventors: Tetsuya Yoshida, Sayama (JP); Satoshi Uehara, Sayama (JP)

(73) Assignee: Soken Chemical & Engineering Co., Ltd., Tokyo (JP)

( * ) Notice: Subject to any disclaimer, the term of this patent is extended or adjusted under 35 U.S.C. 154(b) by 275 days.

(21) Appl. No.: 12/668,301

(22) PCT Filed: Jul. 10, 2008

(86) PCT No.: PCT/JP2008/062463
§ 371 (c)(1),
(2), (4) Date: Jan. 8, 2010

(87) PCT Pub. No.: WO2009/008470
PCT Pub. Date: Jan. 15, 2009

(65) Prior Publication Data
US 2010/0208343 A1   Aug. 19, 2010

(30) Foreign Application Priority Data
Jul. 11, 2007   (JP) ................. 2007-182336

(51) Int. Cl.
C08F 120/10 (2006.01)
C09K 19/00 (2006.01)
C09D 5/02 (2006.01)
G02B 1/08 (2006.01)

(52) U.S. Cl. .......... 525/330.3; 428/1.31; 428/1.33; 524/556; 359/485.03

(58) Field of Classification Search .......... 525/330.3; 428/1.31, 1.33; 524/556; 359/485.03
See application file for complete search history.

(56) References Cited

U.S. PATENT DOCUMENTS
2009/0270557 A1   10/2009   Tomita et al.

FOREIGN PATENT DOCUMENTS

| | | | |
|---|---|---|---|
| JP | 8325543 A | | 12/1996 |
| JP | 09145925 A | | 6/1997 |
| JP | 2001040037 A | | 2/2001 |
| JP | 2001342447 A | | 12/2001 |
| JP | 2003329832 A | | 11/2003 |
| JP | 2004244561 A | | 9/2004 |
| JP | 2005281338 A | * | 10/2005 |
| JP | 2007009006 A | * | 1/2007 |
| JP | 2007138056 A | * | 6/2007 |
| WO | 2007058277 A1 | | 5/2007 |

* cited by examiner

Primary Examiner — Michael M Bernshteyn
(74) Attorney, Agent, or Firm — The Webb Law Firm

(57) ABSTRACT

An adhesive composition for polarizing plates in which an acrylic polymer, a tin compound having a dialkyl group and serving as a cross-linking accelerator and an isocyanate cross-linker are dissolved in an organic solvent, the acrylic polymer being formed by copolymerization of monomers containing an alkyl (meth)acrylate, a hydroxyl group containing monomer and/or a carboxyl group containing monomer, wherein preferably, a solution containing 30% by weight of the acrylic polymer which constitutes the adhesive composition, dissolved in 70% by weight of ethyl acetate has a viscosity in the range of 0.5 to 10.0 Pa·s measured at 23° C., and the acrylic polymer has a weight-average molecular weight in the range of 300,000 to 700,000.

23 Claims, No Drawings

ADHESIVE FOR POLARIZING PLATE AND POLARIZING PLATE HAVING ADHESIVE LAYER

TECHNICAL FIELD

The present invention relates to a productive adhesive composition for polarizing plates that has characteristics such as adhesion and durability even under high temperature and high humidity conditions and that exhibits low light leakage, and to a polarizing plate having an adhesive layer formed using the adhesive. The present invention also relates to an adhesive composition for polarizing plates that has a sufficient pot life in adhesive coating, that greatly reduces the curing time and that uses a (meth)acrylic monomer, and to a polarizing plate having an adhesive layer formed using the adhesive.

BACKGROUND ART

Because acrylic adhesive compositions conventionally used for polarizing plates have weight-average molecular weights (typically 1,000,000 to 1,500,000) higher than the weight-average molecular weights of acrylic adhesive compositions for labels and building materials, coating of these acrylic adhesive compositions for polarizing plates requires large amounts of diluting solvents (such as toluene and ethyl acetate) and accordingly requires a long drying time to remove the diluting solvents, which results in low production efficiency. An amendment of the Air Pollution Control Act has tightened the control of emissions of volatile organic compounds (VOC) such as toluene and ethyl acetate used as the diluting solvents. In view of the situations described above, there is an increasing demand for an adhesive composition for polarizing plates that can be applied at a high concentration of polymer or a small amount of diluting solvent.

For example, Patent Document 1 (Japanese Patent Laid-Open No. H09-145925) discloses a particular acrylic adhesive composition for polarizing plates that has improved adhesive and cohesive durability. The acrylic adhesive composition contains a thiol compound having an alkoxysilyl or hydroxyl group as a chain transfer agent in a particular acrylic monomer mixture and has a weight-average molecular weight in the range of 800,000 to 1,500,000.

However, a coating solution containing such a high-molecular-weight adhesive composition in an organic solvent has a very high viscosity. When the coating solution is practically applied to a substrate, therefore, the coating solution must be diluted with solvent to a concentration in the range of approximately 15 to 20% by weight. This results in low production efficiency.

Patent Document 2 (Japanese Patent Laid-Open No. 2007-9006) discloses an acrylic adhesive for optical displays that has a viscosity in the range of 1000 mPa·s to 4000 mPa·s. Although such a viscosity allows the amount of solvent used in coating to be decreased, characteristics such as durability and adhesion required for an adhesive composition for polarizing plates were not sufficiently achieved.

Patent Document 3 (Japanese Patent Laid-Open No. 2001-40037) discloses an acrylic polymer produced using a thiol compound in the presence of a particular catalyst, and a curable composition. This acrylic polymer is a polymer which has a controlled polymer end group and is produced using a metallocene catalyst and a thiol compound having a reactive silyl group in the molecule. A high-reactive monomer, the reaction of which could not be controlled previously because of a runaway reaction, can be obtained without using a reaction solvent. The acrylic polymer has further improved reaction curability.

However, the percentage of polymerization ranges from approximately 40 to 60% by weight, and the resulting polymer has a weight-average molecular weight of as low as 500 to 100,000. Characteristics such as adhesion and durability of the acrylic polymer must therefore be improved to use the acrylic polymer as an adhesive for polarizing plates.

As adhesives for polarizing plates, adhesive compositions where an acrylic polymer having a functional group, a cross-linker that can react with the functional group to form a three-dimensional cross-linked structure, and a silane coupling agent are dissolved in an organic solvent are used.

In such adhesives for polarizing plates, a functional group, such as a hydroxyl group or a carboxyl group of an acrylic polymer can be bonded to an isocyanate group of a polyisocyanate compound or an epoxy group of a glycidyl compound which are curing agents, to form a three-dimensional structure, thereby adhering a glass substrate to a polarizing plate.

However, since an adhesive composition for polarizing plates is used for expensive liquid crystal apparatuses, a work-in-process roll coated with an adhesive (a three-layer structure of a polarizing plate/an adhesive layer/a release film, or a release film/an adhesive layer/a release film) is stored in an aging room set at a temperature in the range of 20 to 50° C. (in general, 40° C.) for approximately one week to crosslink the adhesive so as to meet predetermined performance requirements. The work-in-process roll is then cut into a desired size. After a release film is removed, the adhesive layer is attached to a liquid crystal cell. Thus, a large number of work-in-process rolls corresponding to the storage period in the aging room must be stored. In addition, costs associated with the aging room are high. Thus, there is a growing demand for an adhesive composition for polarizing plates that can decrease the curing time and obviate the need for an aging room.

As a method for decreasing the curing time, a curing accelerator is sometimes added to an acrylic monomer. The addition of a curing accelerator, however, often considerably increases the viscosity of an adhesive at an early stage, resulting in an increase in the viscosity of a coating solution. This makes the application of the adhesive difficult.

If such gelation at an early stage has increased the viscosity of an adhesive coating solution, the adhesive coating solution cannot be smoothly applied without using a large amount of organic solvent. As in the high-molecular-weight adhesive coating solution described above, therefore, there is the problem that a large amount of organic solvent must be removed to form an adhesive layer having favorable characteristics.

Curing accelerators to be added to such adhesives described above include various compounds such as amine compounds and organic metal compounds.

For example, Patent Document 4 (Japanese Patent Laid-Open No. 2003-329832) discloses an adhesive optical film having an adhesive layer on one side of the optical film, wherein the adhesive layer is formed of a bridged compound of a composition containing an acrylic polymer having a weight-average molecular weight of 700,000 or more and a functional group that can react with an isocyanate, a polyhydroxyalkylamine compound and a polyisocyanate compound. Although the polyhydroxyalkylamine compound is used as a curing accelerator, such an amine compound turns yellow over time and is therefore unsuited as a curing accelerator for an adhesive for optical films.

Furthermore, for example, Patent Document 5 (WO 2007/058277 pamphlet) paragraphs [0036] to [0038] describe the availability of a cross-linking accelerator to rapidly form a crosslinked structure with an isocyanate compound and provide a listing of specific curing accelerators, including amino compounds such as N,N,N",N"-tetramethylhexanediamine, triethylamine and imidazole; and organometallic compounds such as cobalt naphthenate, dibutyltin diacetate, dibutyltin diacetylacetonate, tetra-n-butyltin, trimethyltin hydroxide and dibutyltin laurate.

It is an object of the present invention to provide an adhesive composition for polarizing plates that ensures characteristics such as adhesion and durability required for adhesives for polarizing plates and that can be applied as an adhesive with a decreased amount of diluent, and a polarizing plate having an adhesive layer formed using the adhesive composition.

It is another object of the present invention to provide an adhesive composition for polarizing plates that has a pot life suitable for adhesive coating and that can greatly reduce the curing time, and a polarizing plate formed using such adhesive composition.

SUMMARY OF THE INVENTION

An adhesive composition for polarizing plates according to the present invention is an adhesive composition in which a (meth)acrylic polymer, a cross-linker, and a cross-linking accelerator are dissolved in an organic solvent, the (meth)acrylic polymer being formed by copolymerization of monomers containing an alkyl (meth)acrylate, a hydroxyl group containing monomer, and/or a carboxyl group containing monomer, wherein a solution containing 30% by weight of (meth) acrylic polymer which constitutes the adhesive composition, dissolved in 70% by weight of ethyl acetate has a viscosity in the range of 0.5 to 10.0 Pa·s measured at 23° C., the (meth) acrylic polymer having a weight-average molecular weight in the range of 300,000 to 900,000 is crosslinked with an isocyanate cross-linker in the presence of the cross-linking accelerator, and the adhesive composition for polarizing plates contains 25 to 60% by weight of non-volatile matter.

Preferably, an adhesive composition for polarizing plates according to the present invention is an adhesive composition in which an acrylic polymer, a tin compound having a dialkyl group and serving as a cross-linking accelerator, and an isocyanate cross-linker are dissolved in an organic solvent, the acrylic polymer being formed by copolymerization of monomers containing an alkyl (meth)acrylate, a hydroxyl group containing monomer, and/or a carboxyl group containing monomer, wherein a solution containing 30% by weight of acrylic polymer which constitutes the adhesive composition, dissolved in 70% by weight of ethyl acetate has a viscosity in the range of 0.5 to 10.0 Pa·s measured at 23° C., the acrylic polymer has a weight-average molecular weight in the range of 300,000 to 700,000, and temporal changes in the gel fraction of an adhesive forming an adhesive layer formed by the application of the adhesive composition satisfy the following conditions:

(a) the gel fraction 10 hours after the formation of the adhesive layer is 30% or more, preferably 50% or more, particularly preferably 60% or more, (b) the difference in gel fraction between 10 hours and three days after the formation of the adhesive layer is 15% or less, and (c) the difference in gel fraction between 24 hours and 30 days after the formation of the adhesive layer is 5% or less.

A polarizing plate having an adhesive layer according to the present invention is a polarizing plate that has an adhesive layer formed from an adhesive composition in which a (meth) acrylic polymer, a cross-linker, and a cross-linking accelerator are dissolved in an organic solvent, the (meth)acrylic polymer being formed by copolymerization of monomers containing an alkyl (meth)acrylate, a hydroxyl group containing monomer, and/or a carboxyl group containing monomer, wherein a solution containing 30% by weight of the (meth) acrylic polymer which constitutes the adhesive composition, dissolved in 70% by weight of ethyl acetate has a viscosity in the range of 0.5 to 10.0 Pa·s measured at 23° C., the (meth) acrylic polymer having a weight-average molecular weight in the range of 300,000 to 900,000 is crosslinked with an isocyanate cross-linker in the presence of the cross-linking accelerator, the adhesive composition contains 25 to 60% by weight of non-volatile matter, and the adhesive layer is formed on at least one side of the polarizing plate.

In a polarizing plate having an adhesive layer according to the present invention, the adhesive composition is an adhesive composition in which an acrylic polymer, a tin compound having a dialkyl group and serving as a cross-linking accelerator, and an isocyanate cross-linker are dissolved in an organic solvent, the acrylic polymer being formed by copolymerization of monomers containing an alkyl (meth)acrylate, a hydroxyl group containing monomer, and/or a carboxyl group containing monomer, wherein a solution containing 30% by weight of the acrylic polymer which constitutes the adhesive composition, dissolved in 70% by weight of ethyl acetate has a viscosity in the range of 0.5 to 10.0 Pa·s measured at 23° C., the acrylic polymer has a weight-average molecular weight in the range of 300,000 to 700,000, and an adhesive layer formed by the application of the adhesive composition can exert sufficient durability, reworkability, and an ability to prevent light leakage as an adhesive composition for polarizing plates 10 hours after the application. Preferably, an adhesive layer is formed on at least one side of the polarizing plate, in which temporal changes in the gel fraction of an adhesive constituting the adhesive layer satisfy the following conditions:

(a) the gel fraction 10 hours after the formation of the adhesive layer is 30% or more, preferably 50% or more, more preferably 60% or more, (b) the difference in gel fraction between 10 hours and three days after the formation of the adhesive layer is 15% or less, and (c) the difference in gel fraction between 24 hours and 30 days after the formation of the adhesive layer is 5% or less.

The term "polarizing plates", as used herein, broadly includes polarizing films, retardation films, antireflection films and brightness-enhancement films. The polarizing films include polarizing films attached with a Wide View (WV) Film as well as polarizing films subjected to certain treatments such as AR treatment, AG treatment or HC treatment.

In an adhesive composition for polarizing plates according to the present invention, the solid content is increased (the amount of organic solvent is decreased) by using an acrylic polymer having a lower molecular weight than generally used acrylic polymers. This decreases the amount of organic solvent to be removed, allowing an adhesive layer to be formed efficiently.

In addition, use of a particular cross-linking accelerator can reduce an increase in the viscosity of the adhesive composition over time, ensure a sufficient pot life for adhesive coating, increase the gel fraction of an adhesive to a certain value in a short period of time, and reduce a subsequent increase in the gel fraction.

ADVANTAGES OF THE INVENTION

The present invention can provide an adhesive composition for polarizing plates that has sufficient adhesion to a glass substrate and high durability even under high temperature and high humidity conditions and has excellent reworkability.

Such an adhesive composition for polarizing plates contains a (meth)acrylic polymer such that a solution containing 30% by weight of (meth)acrylic polymer in 70% by weight of ethyl acetate has a viscosity in the range of 0.5 to 10.0 Pa·s measured at 23° C. The adhesive composition can therefore decrease the amount of diluent and improve production efficiency.

Furthermore, the addition of a curing accelerator does not cause coloring of an adhesive layer.

BEST MODE FOR CARRYING OUT THE INVENTION

An adhesive composition for polarizing plates, a method for producing the adhesive composition and a polarizing plate having an adhesive layer according to the present invention will be more specifically described below.

An adhesive composition for polarizing plates according to the present invention is an adhesive composition for polarizing plates in which a (meth)acrylic polymer, a cross-linker and a cross-linking accelerator are dissolved in an organic solvent.

A (meth)acrylic polymer constituting an adhesive composition for polarizing plates according to the present invention is a (meth)acrylic polymer formed by copolymerization of monomers containing an alkyl (meth)acrylate, a hydroxyl group containing monomer and/or a carboxyl group containing monomer, and a benzene ring containing monomer and/or a silyl group containing monomer.

Examples of the alkyl (meth)acrylate include monomers represented by the following formula [A].

[Formula 1]

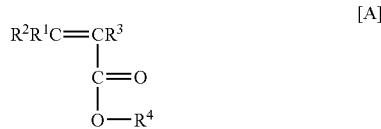

[A]

In the formula [A], $R^1$ to $R^3$ independently denotes a hydrogen atom, a halogen atom or an alkyl group having 1 to 3 carbon atoms, and $R^4$ denotes a hydrogen atom or a hydrocarbon group having 1 to 22 carbon atoms (the hydrocarbon group may be a straight chain or have a side chain, at least part of hydrogen atoms of the hydrocarbon group or a group forming a side chain of the hydrocarbon group may be substituted by at least one polar group selected from the group consisting of a chlorine atom, a fluorine atom, a primary amino group, a secondary amino group, a tertiary amino group, a quaternary amine salt group, an amide group, an isocyanate group, an alkylene oxide group, a hydroxysilyl group, a methoxysilyl group, an ethoxysilyl group, a propoxysilyl group, a chlorosilyl group, a bromosilyl group and a glycidyl group or by a reactive functional group, the hydrocarbon group may have a double bond, and the hydrocarbon group may have a ring structure). Examples of $R^4$ include an alkyl group, a cycloalkyl group, an alkenyl group, a cycloalkenyl group, an alkoxy group and an alkyl ether group. At least part of hydrogen atoms constituting the group $R^4$ may be substituted by a halogen atom, a sulfo group, or a glycidyl group.

Specific examples of such (meth)acrylate monomers include alkyl acrylates such as methyl acrylate, ethyl acrylate, propyl acrylate, butyl acrylate, pentyl acrylate, hexyl acrylate, 2-ethylhexyl acrylate, octyl acrylate, nonyl acrylate, decyl acrylate and dodecyl acrylate;

alkoxyalkyl acrylates such as methoxyethyl acrylate, ethoxyethyl acrylate, propoxyethyl acrylate, butoxyethyl acrylate and ethoxypropyl acrylate;

alkyl methacrylates such as methyl methacrylate, ethyl methacrylate, propyl methacrylate, butyl methacrylate, pentyl methacrylate, hexyl methacrylate, 2-ethylhexyl methacrylate, octyl methacrylate, nonyl methacrylate, decyl methacrylate and dodecyl methacrylate;

alkoxyalkyl methacrylates such as methoxyethyl methacrylate, ethoxyethyl methacrylate, propoxyethyl methacrylate, butoxyethyl methacrylate and ethoxypropyl methacrylate;

(poly)alkylene glycol diacrylates such as ethylene glycol diacrylate, diethylene glycol diacrylate, triethylene glycol diacrylate, poly(ethylene glycol) diacrylate, propylene glycol diacrylate, dipropylene glycol diacrylate and tripropylene glycol diacrylate;

(poly)alkylene glycol dimethacrylates such as ethylene glycol dimethacrylate, diethylene glycol dimethacrylate, triethylene glycol dimethacrylate, poly(ethylene glycol) diacrylate, propylene glycol dimethacrylate, dipropylene glycol dimethacrylate and tripropylene glycol dimethacrylate;

polyvalent acrylates such as trimethylolpropane triacrylate;

polyvalent methacrylates such as trimethylolpropane trimethacrylate;

halides such as 2-chloroethyl acrylate and 2-chloroethyl methacrylate;

acrylates of alicyclic alcohols such as cyclohexyl acrylate;

methacrylates of alicyclic alcohols such as cyclohexyl methacrylate; and fluorine-substituted alkyl methacrylates and fluorine-substituted alkyl acrylates.

These (meth)acrylate monomers can be used alone or in combination. These (meth)acrylate monomers may be liquid, solid, or gaseous under the reaction conditions. For ease of operation, liquid monomers are preferably used in reactions.

An acrylic polymer according to the present invention is principally formed by the copolymerization of acrylic monomers described above. The acrylic monomers have functional groups so that the acrylic monomers can react with a cross-linker contained in an adhesive composition according to the present invention to form a three-dimensional crosslinked structure. The functional group is principally a hydroxyl group and/or a carboxyl group. Thus, in the present invention, a functional group-containing monomer that, together with the acrylic monomers described above, forms an acrylic polymer, is a hydroxyl group containing monomer or a carboxyl group containing monomer, or a hydroxyl group containing monomer and a carboxyl group containing monomer.

Specific examples of such a hydroxyl group containing monomer include 2-hydroxyethyl (meth)acrylate, 3-hydroxypropyl (meth)acrylate, 4-hydroxybutyl (meth)acrylate, chloro-2-hydroxypropyl (meth)acrylate, monoesters between acrylic acid or methacrylic acid and poly(propylene glycol) or poly(ethylene glycol), and adducts between lactones and 2-hydroxyethyl (meth)acrylate. Among them, 2-hydroxyethyl acrylate and 4-hydroxybutyl acrylate are preferred. These hydroxyl group containing monomers may be used alone or in combination. These hydroxyl group containing monomers may be liquid, solid, or gaseous under the reaction conditions. For ease of operation, liquid monomers are preferably used in reactions.

Specific examples of the carboxyl group containing monomers include (meth)acrylic acid, alkali metal salts of (meth)acrylic acid, itaconic acid, maleic anhydride, maleic acid, fumaric acid and β-carboxyethyl acrylate. Among them, from the viewpoints of availability and costs, (meth)acrylic acid is preferred.

The (meth)acrylate monomer, the hydroxyl group containing monomer, and/or the carboxyl group containing monomer are copolymerized such that the used amount of (meth)acrylate monomer ranges from 90 to 99.95% by weight, preferably 92 to 99.9% by weight, more preferably 95 to 99.8% by weight and the used amount of hydroxyl group containing monomer and/or carboxyl group containing monomer ranges from usually 0.05 to 10% by weight, preferably 0.1 to 8% by weight, more preferably 0.2 to 5% by weight.

The hydroxyl group containing monomer and the carboxyl group containing monomer may be used alone. To effectively perform the functions described above, however, both the hydroxyl group containing monomer and the carboxyl group containing monomer are preferably copolymerized with the (meth)acrylate monomer.

When both the hydroxyl group containing monomer and the carboxyl group containing monomer are used, copolymerization is performed at a weight ratio of the hydroxyl group containing monomer to the carboxyl group containing monomer usually in the range of 1:120 to 100:1, preferably 1:20 to 25:1.

Preferably, an acrylic polymer constituting an adhesive composition for polarizing plates according to the present invention is copolymerized with a benzene ring containing monomer or a silyl group containing monomer or with a benzene ring containing monomer and a silyl group containing monomer.

Specific examples of benzene ring containing monomers used in the present invention include styrene, vinylbenzene, α-methylvinylbenzene, phenyl (meth)acrylate, phenoxyethyl (meth)acrylate, benzyl (meth)acrylate, benzyloxyethyl (meth)acrylate, phenoxydiethylene glycol (meth)acrylate, ethylene oxide modified nonylphenol (meth)acrylate and biphenyl (meth)acrylate. These monomers may be used alone or in combination. Among these monomers, benzene ring containing (meth)acrylates are preferred.

In copolymerization with a benzene ring containing monomer, 0.1 to 100 parts by weight of a benzene ring containing monomer with respect to 100 parts by weight of a (meth)acrylate monomer is preferably used.

A monomer having a silyl group used herein can be, for example, represented by the following formula [B].

[Formula 2]

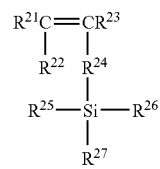

[B]

In the formula [B], $R^{21}$ and $R^{23}$ are the same as $R^1$ to $R^3$ in the formula [A], and $R^{22}$ denotes any group or atom selected from a hydrogen atom, a halogen atom, a —CN group, a glycidyl group, an alkyl group, an alkoxy group, an alkenyl group, a cycloalkenyl group, an aryl group, an allyl ether group, an alkyl ether group, an alkoxysilyl group and an alkylalkoxysilyl group. When the group $R^{22}$ is a group other than a hydrogen atom or a halogen atom, at least part of hydrogen atoms constituting the group $R^{22}$ may be substituted by a halogen atom. The group $R^{22}$ may be a group that has a constitutional unit derived from an alkylene glycol or a group that has an alkoxysilyl group, an alkylalkoxysilyl group, a methylol group or an alkoxyamide group. $R^{24}$ denotes a divalent group such as —CO—O—, —CH2-, —C2H4-, —CO—O—C2H4- or —CO—O—C2H4-O—, or a single bond. $R^{25}$, $R^{26}$ and $R^{27}$ independently denote an alkyl group, an alkoxy group, a hydrogen atom, or a halogen atom.

Specific examples of such monomers having a silyl group include vinyl compound monomers in which a silyl group is directly introduced into a vinyl group, such as vinyltrimethoxysilane, γ-vinyl-monochlorodimethoxysilane, γ-vinyl-trichlorosilane and γ-vinyl-dichloro-monomethylsilane;

acrylic monomers in which a silyl group is introduced into a reactive (meth)acryloyl group, such as γ-methacryloxypropyltrimethoxysilane, γ-methacryloxypropyltriethoxysilane, γ-methacryloxypropylmonomethyldimethoxysilane and γ-acryloxypropyltrimethoxysilane; and monomers in which a silyl group is introduced into a compound having a polymerizable unsaturated group, such as allyltrimethoxysilane and trimethoxysilylpropylallylamine.

In copolymerization with the monomer having a silyl group, 0.015 to 0.12 parts by weight of the monomer having a silyl group with respect to 100 parts by weight of the (meth)acrylate monomer, the hydroxyl group containing monomer and the carboxyl group containing monomer in total is generally used.

It is desirable that an adhesive composition for polarizing plates according to the present invention is a composition in which the (meth)acrylic polymer further contains a silane coupling agent. The (meth)acrylic polymer can be cured through the reaction with a silane coupling agent. The silane coupling agent used herein is a compound having a molecular weight in the range of 100 to 1000.

Specific examples of such silane coupling agents include vinyltrichlorosilane, vinyltris(β-methoxyethoxy)silane, vinyltriethoxysilane, vinyltrimethoxysilane, γ-(methacryloxypropyl)trimethoxysilane, β-(3,4-epoxycyclohexyl)ethyltrimethoxysilane, γ-glycidoxypropyltrimethoxysilane, γ-glycidoxypropylmethyldiethoxysilane, N-β(aminoethyl)γ-aminopropylmethoxysilane, N-β(aminoethyl)γ-aminopropylmethyldimethoxysilane, γ-aminopropyltriethoxysilane, N-phenyl-γ-aminopropylmethoxysilane, γ-mercaptopropylmethoxysilane and γ-chloropropyltrimethoxysilane.

When these silane coupling agents are used, the amount of silane coupling agent may usually range from 0.1 to 0.5 parts by weight, preferably from 0.15 to 0.25 parts by weight, with respect to 100 parts by weight of the (meth)acrylic polymer. By adding the acrylic polymer described above gradually to such a silane coupling agent, part of reactive silyl groups of the silane coupling agent is bonded to the (meth)acrylic polymer, the silane coupling agent to the (meth)acrylic polymer without losing its activity, characteristics of the silane coupling agent can be introduced into an adhesive. These silane coupling agents may be used alone or in combination.

In copolymerization of these monomers, various methods for producing acrylic polymers such as seed polymerization, emulsion polymerization, soap-free emulsion polymerization, bulk polymerization and solution polymerization can be used. In the present invention, solution polymerization is preferably used. The polymerization reaction of these acrylic monomers can also be initiated by heating without using a catalyst. By altering the reaction conditions such as heating temperature, the molecular weight of the resulting acrylic polymer can be controlled.

However, since an adhesive composition for polarizing plates according to the present invention contains a large amount of relatively low molecular weight acrylic polymer in an organic solvent, the polymerization reaction of the acrylic monomer must be adequately controlled.

Thus, in the polymerization of an acrylic polymer used in the present invention, further introduction of a functional group into an' end of a molecular chain allows a cross-linking reaction to be gathered more effectively. As described below, in a polymerization method, preferably, the characteristics of the resulting acrylic polymer is controlled by using an organic solvent as a reaction solvent and using a particular catalyst and a particular thiol compound that can be dissolved in the organic solvent.

In the polymerization of an acrylic polymer constituting an adhesive composition for polarizing plates according to the present invention, for example, an organic solvent such as methyl ethyl ketone, acetone, acetylacetone, ethyl acetate, tetrahydrofuran, dioxane, cyclohexanone, n-hexane, toluene or xylene is preferably used as a reaction solvent. Among them, from an economic point of view, ethyl acetate is preferred. These organic solvents may be used alone or in combination.

An organometallic compound represented by the following formula [I] can be used as a catalyst suitable for a polymerization reaction in such reaction solvent.

[Formula 3]

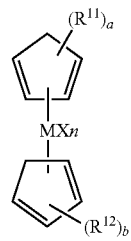

[I]

In the formula [I], M denotes a metal selected from the group consisting of metals of groups 4A, 4B, and 5A in a periodic table, chromium and ruthenium. More specifically, M denotes titanium, zirconium, chromium, ruthenium, vanadium, palladium, tin or the like. In the formula [I], $R^{11}$ and $R^{12}$ independently denote at least one group selected from the group consisting of aliphatic hydrocarbon groups optionally having a substituent, alicyclic hydrocarbon groups optionally having a substituent, aromatic hydrocarbon groups optionally having a substituent and silicon-containing groups optionally having a substituent, a hydrogen atom or a single bond.

$R^{11}$ and $R^{12}$ may cooperatively link two 5-membered rings of the formula [I]. A plurality of contiguous $R^{11}$s or $R^{12}$s may cooperatively form a ring structure. In the formula [I], a and b independently denote an integer in the range of 1 to 4, X denotes a halogen atom such as chlorine, bromine or iodine, or a hydrocarbon group in which at least part of hydrogen atoms may be substituted by halogen atoms, and n denotes 0 or an integer equal to (the valence of the metal M-2).

Examples of such organometallic compounds include titanocene compounds such as dicyclopentadiene-Ti-dichloride, dicyclopentadiene-Ti-bisphenyl, dicyclopentadiene-Ti-bis-2,3,4,5,6-pentafluorophen-1-yl, dicyclopentadiene-Ti-bis-2,3,5,6-tetrafluorophen-1-yl, dicyclopentadiene-Ti-bis-2,5,6-trifluorophen-1-yl, dicyclopentadiene-Ti-bis-2,6-difluorophen-1-yl, dicyclopentadiene-Ti-bis-2,4-difluorophen-1-yl, dimethylcyclopentadienyl-Ti-bis-2,3,4,5,6-pentafluorophen-1-yl, dimethylcyclopentadienyl-Ti-bis-2,3,5,6-tetrafluorophen-1-yl, dimethylcyclopentadienyl-Ti-bis-2,6-difluorophen-1-yl and dimethylcyclopentadienyl-Ti-bis-2,6-difluoro-3-(pyrr-1-yl)-phen-1-yl;

zirconocene compounds such as dicyclopentadienyl-Zr-dichloride, dicyclopentadiene-Zr-bisphenyl, dicyclopentadiene-Zr-bis-2,3,4,5,6-pentafluorophen-1-yl, dicyclopentadiene-Zr-bis-2,3,5,6-tetrafluorophen-1-yl, dicyclopentadiene-Zr-bis-2,5,6-trifluorophen-1-yl, dicyclopentadiene-Zr-bis-2,6-difluorophen-1-yl, dicyclopentadiene-Zr-bis-2,4-difluorophen-1-yl, dimethylcyclopentadienyl-Zr-bis-2,3,4,5,6-pentafluorophen-1-yl, dimethylcyclopentadienyl-Zr-bis-2,3,5,6-tetrafluorophen-1-yl, dimethylcyclopentadienyl-Zr-bis-2,6-difluorophen-1-yl and dimethylcyclopentadienyl-Zr-bis-2,6-difluoro-3-(pyrr-1-yl)-phen-1-yl);

dicyclopentadienyl-V-chloride, bismethylcyclopentadienyl-V-chloride, bispentamethylcyclopentadienyl-V-chloride, dicyclopentadienyl-Ru-chloride and dicyclopentadienyl-Cr-chloride. These organometallic compounds may be used alone or in combination.

The organometallic compound may be used at a general catalyst level. More specifically, the amount of organometallic compound ranges from usually 0.001 to 1 part by weight, preferably from 0.005 to 0.01 part by weight, based on 100 parts by weight of monomers to be polymerized in total.

An increase in the amount of organometallic compound results in an increase in the percentage of polymerization per unit time, but does not have a significant influence on the final percentage of polymerization. Although the amount of organometallic compound used does not have a significant influence on the molecular weight of the resulting polymer, a polymerization reaction by which monodisperse polymers having uniformed molecular weights are formed does not proceed effectively in the absence of the organometallic compound. Use of such organometallic compound as a polymerization catalyst allows the weight-average molecular weight of the resulting (meth)acrylic polymer to be appropriately controlled in the range of 300,000 to 900,000, preferably 300,000 to 700,000. In addition, the organometallic compound also decreases the degree of molecular weight distribution and accordingly decreases the amount of high-molecular-weight polymer. Even when a large amount of (meth) acrylic polymer is contained, therefore, the organometallic compound can prevent an excessive increase in solution viscosity. Thus, even when an adhesive composition for polarizing plates according to the present invention contains a large amount of acrylic polymer, the adhesive composition can be applied as a thin layer with a known coater such as a comma coater, a Mayer bar coater, a die coater, a lip coater or a gravure coater.

In the production of a (meth)acrylic polymer to be used in an adhesive composition for polarizing plates according to the present invention, it is desirable that components are copolymerized in the presence of an alkoxysilyl group containing thiol compound.

The alkoxysilyl group containing thiol compound is a thiol compound having an alkoxysilyl group and is a compound represented by a formula of HS—$R^o$.

$R^o$ denotes an alkoxysilyl group and is a reactive group. The alkoxysilyl group is preferably one selected from the group consisting of a trimethoxysilyl group, a methyldimethoxysilyl group, a triethoxysilyl group and a methyldiethoxysilyl group. Among them, a trimethoxysilyl group or a methyldimethoxysilyl group is more preferable. More specifically, examples of such thiol compounds having an alkoxysilyl group include 3-mercaptopropyl-trimethoxysilane (γ-mercaptopropyltrimethoxysilane), 3-mercaptopropyl-triethoxysilane, 3-mercaptopropyl-monomethyldimethoxysilane (γ-mercaptopropylmethyldimethoxysilane), 3-mercaptopropyl-monophenyldimethoxysilane, 3-mercaptopropyl-dimethylmonomethoxysilane, 3-mercaptopropyl-monomethyldiethoxysilane, 4-mercaptobutyl-trimethoxysilane and 3-mercaptobutyl-trimethoxysilane.

Suitable examples of a thiol compound having an alkoxysilyl group that can be used in the present invention include γ-mercaptopropyltrimethoxysilane and γ-mercaptopropylmethyldimethoxysilane.

The alkoxysilyl group containing thiol compound has a tendency to yield a .S—$R^o$ radical by being abstracted a hydrogen atom in a reaction. The radical is probably introduced into at least one end of the resulting polymer. The alkoxysilyl group introduced into the end of the polymer does not lose its activity through the reaction and maintains its activity.

Thus, an alkoxysilyl group containing thiol compound HS—$R^o$ yields a .S—$R^o$ by the elimination of a hydrogen atom. The resulting radical is bonded to a polymerizable unsaturated compound and activates the compound, thereby initiating polymerization and limiting the molecular weight. Thus, it can be considered that the thiol compound functions to initiate polymerization (functions as a polymerization initiator) and also functions as a molecular weight modifiers.

Generally 0.015 to 0.12 parts by weight, preferably 0.02 to 0.1 parts by weight, of the alkoxysilyl group containing thiol compound is added to 100 parts by weight of the (meth) acrylate monomers in total. In this case, "100 parts by weight in total" refers to the total amount of, for example, (meth) acrylic monomers used in the formation of a (meth)acrylic polymer.

When the amount of alkoxysilyl group containing thiol compound used is in the range described above, the percentage of polymerization per unit time is increased, and the final percentage of polymerization is also increased. Furthermore, the reaction can proceed smoothly and is prevented from becoming uncontrollable. The amount of alkoxysilyl group containing thiol compound used can also control the molecular weight and the percentage of polymerization of the resulting acrylic polymer.

The polymerization reaction is generally performed in an inert gas atmosphere, and conditions used in common radical polymerization methods can be used. Examples of the inert gases used herein include nitrogen gas, argon gas, helium gas, and carbon dioxide gas. In the present invention, as described above, the (meth)acrylate monomer, the hydroxyl group containing monomer, and/or the carboxyl group containing monomer are (co)polymerized in the presence of a particular organometallic compound and a particular alkoxysilyl group containing thiol compound. In the resulting polymer, at least one resultant end (in many instances, almost all ends of the polymer) is bonded to a residue (—S—$R^o$ formed by the elimination of a hydrogen atom bonded to a sulfur atom from the alkoxysilyl group containing thiol compound.

In this polymerization, a polymerization catalyst composed of the organometallic compound represented by the formula [I] used as a catalyst and an alkoxysilyl group containing thiol compound can be used at a general catalyst level. In general, 0.0000001 to 0.0001 mol of the organometallic compound represented by the formula [I] per mol of unsaturated group of the monomer is used. Preferably, in accordance with the number of moles of alkoxysilyl group containing thiol compound used, the molar ratio of the organometallic compound to the alkoxysilyl group containing thiol compound ranges from 10:1 to 1:10000.

Depending on the monomer type, such polymerization reaction can be performed with heating or warming or with cooling. The polymerization reaction temperature is preferably set at a temperature in the range of 0 to 150° C., particularly preferably 25 to 120° C. At a polymerization reaction temperature in the range described above, the reaction can be prevented from becoming uncontrollable and proceed stably and moderately. Depending on the activity of an unsaturated group of the monomer used, when the reaction temperature is below 0° C., the organometallic compound represented by the formula [I] and the alkoxysilyl group containing thiol compound have low activity as catalysts, and it takes a long period of time to achieve a sufficient percentage of polymerization, resulting in low efficiency. In contrast, under conditions of 25° C. or more, a sufficient percentage of polymerization can be achieved in a short period of time, irrespective of the polymerization activity of the monomer used.

When the polymerization reaction temperature exceeds 150° C., the reaction may become uncontrollable because of considerable heat generation. At a polymerization reaction temperature of 120° C. or less, the reaction can be prevented from becoming uncontrollable and proceed smoothly.

In a polymerization reaction in the presence of an organic solvent, it is desirable that the polymerization reaction temperature is set at the boiling point of the organic solvent+20° C. or less. In polymerization according to the present invention, the reaction time is preferably determined in consideration of the percentage of polymerization, molecular weight and the like. For example, under the conditions as described above, the reaction time usually ranges from 2 to 12 hours, preferably from 2 to 8 hours.

The polymerization reaction can be terminated by decreasing the temperature of the reactants and, if necessary, adding a polymerization terminator such as benzoquinone. The percentage of polymerization of the polymer obtained by such polymerization reaction can generally range from 70 to 99% by weight, preferably from 80 to 98% by weight.

In such reaction as described above, an alkoxysilyl group containing thiol compound may be added at a time at the beginning of the reaction; or an alkoxysilyl group containing thiol compound may be first added and, after a reaction for a desired period of time, be followed by the addition of an alkoxysilyl group containing thiol compound or by the addition of an alkoxysilyl group containing thiol compound, a (meth)acrylate monomer, a hydroxyl group containing monomer, and/or a carboxyl group containing monomer. The further addition of an alkoxysilyl group containing thiol compound or of an alkoxysilyl group containing thiol compound, a (meth)acrylate monomer, a hydroxyl group containing monomer, and/or a carboxyl group containing monomer can further improve the percentage of polymerization. Although the percentage of polymerization of a (meth)acrylic polymer according to the present invention usually ranges from 70 to 99% by weight, preferably from 80 to 98% by weight, further addition of an azo polymerization initiator, as well as an alkoxysilyl group containing thiol compound as described above, can increase the percentage of polymerization to 85% by weight or more.

In the present invention, the alkoxysilyl group containing thiol compound can be used in combination with a thiol compound, including an alkylthiol not having a functional group other than a thiol group such as ethyl mercaptan, butyl mercaptan, hexyl mercaptan, tertiary dodecyl mercaptan, normal dodecyl mercaptan or octyl mercaptan, or an aromatic thiol not having a functional group other than a thiol group such as phenyl mercaptan or benzyl mercaptan, a thiol having a functional group other than a thiol group such as β-mercaptopropionic acid, mercaptoethanol, or thiophenol, a polyfunctional thiol compound in which trithioglycerin or pentaerythritol is esterified with β-mercaptopropionic acid, or a polymer type thiol having an active thiol group such as a polysulfide polymer.

In the case that an acrylic polymer used in the present invention is produced by solution polymerization, generally 30 to 300 parts by weight, preferably 50 to 200 parts by weight of an organic solvent serving as a reaction solvent is added to 100 parts by weight of the monomer component described above. Other substances such as a reaction catalyst are then added, and after the solution becomes homogeneous, the monomer component is allowed to react generally at a temperature of the boiling point of the organic solvent+20° C. or less for usually 2 to 12 hours, preferably 2 to 8 hours, to produce the acrylic polymer.

Preferably, the resulting (meth)acrylic polymer has a narrow molecular weight distribution, a weight-average molecular weight (Mw) generally in the range of 300,000 to 900,000, preferably 300,000 to 700,000 and a number-average molecular weight (Mn) generally in the range of 80,000 to 300,000. The molecular weight distribution (Mw/Mn) ranges from 2 to 20. The weight-average molecular weight (Mw) of the (meth)acrylic polymer is less than half the weight-average molecular weights of acrylic polymers currently used in adhesives for polarizing plates and is very low.

In addition, since the weight-average molecular weight is very low for an adhesive composition for polarizing plates, its solution in an organic solvent has a low viscosity. When 30 parts by weight of the (meth)acrylic polymer produced as described above is dissolved in 70 parts by weight of ethyl acetate, this organic solvent solution has a viscosity in the range of 0.5 to 10.0 Pa·s, preferably 2.0 to 8.0 Pa·s, measured at 23° C.

The viscosity of the solution containing 30% by weight of (meth)acrylic polymer dissolved in 70% by weight of ethyl acetate means a value measured with a B type viscometer in accordance with JIS K 6833. As described above, in a (meth) acrylic polymer used in the present invention, since the viscosity of a solution containing the (meth)acrylic polymer at a concentration as high as 30% by weight in ethyl acetate is low, a further increase in the concentration of the (meth)acrylic polymer in an adhesive composition for polarizing plates according to the present invention does not result in an excessive increase in the viscosity of the adhesive composition.

Thus, the non-volatile matter content of an adhesive composition for polarizing plates according to the present invention can range from 25 to 60% by weight, preferably 28 to 50% by weight, more preferably 30 to 40% by weight.

Although a (meth)acrylic polymer used in the present invention can be produced as described above, the polymerization reaction preferably proceeds efficiently without using an azo polymerization initiator often used in the production of existing acrylic polymers, such as 2,2'-azobisisobutyric acid dimethyl ester, 2,2'-azobis-(2,4-dimethylvaleronitrile), 2,2'-azobis-(2-butyronitrile), 2,2'-azobisisobutyronitrile, dimethyl-2,2'-azobisisobutyrate or 1,1'-azobis-(cyclohexane-1-carbonitrile). This is because simultaneous addition of the organometallic compound represented by the formula [I] and an azo polymerization initiator may inhibit the activity of the organometallic compound. These azo polymerization initiators may be used in an auxiliary manner. In this case, an azo polymerization initiator is usually added when 50% or more of the polymerization reaction has proceeded. The late addition of an azo polymerization initiator can further increase the percentage of polymerization without inhibiting the active catalytic effect of an organometallic compound and the polymerization initiating function of an alkoxysilyl group containing thiol compound.

In the present invention, a disulfide compound, a trisulfide compound or a tetrasulfide compound can be used to control the rate and degree of polymerization.

Examples of a disulfide compound, a trisulfide compound and a tetrasulfide compound that can be used herein as polymerization modifiers include diethyl trisulfide, dibutyl tetrasulfide, diphenyl disulfide, bis(2-hydroxyethyl) disulfide, bis(4-hydroxybutyl) tetrasulfide, bis(3-hydroxypropyl) trisulfide, bis(3-carboxypropyl) trisulfide, bis(3-carboxypropyl) tetrasulfide, bis(3-propyltrimethoxysilane) disulfide and bis(3-propyltriethoxysilane) tetrasulfide. These sulfide compounds may be used alone or in combination.

Preferably, an adhesive composition for polarizing plates according to the present invention contains 0.01 to 0.5 parts by weight of a cross-linker and 0.01 to 0.5 parts by weight of a cross-linking accelerator based on 100 parts by weight of the (meth)acrylic polymer.

Existing adhesive compositions for polarizing plates must contain relatively high molecular weight polymers to achieve high adhesion and durability required for the composition, and accordingly have high viscosities. Existing adhesive compositions therefore cannot be applied to a support without being diluted with solvent to approximately 15 to 20% by weight. Thus, existing adhesive compositions require a large amount of diluting solvent and a long period of time to remove the diluent, resulting in low production efficiency.

However, an adhesive composition for polarizing plates according to the present invention contains a particular (meth)acrylic polymer, in which a solution containing 30% by weight of (meth)acrylic polymer dissolved in 70% by weight of ethyl acetate has a viscosity in the range described above measured at 23° C. Thus, the adhesive composition for polarizing plates can exhibit sufficient coatability when the (meth)acrylic polymer is diluted with an organic solvent such that the non-volatile matter content of the adhesive composition for polarizing plates ranges from 25 to 60% by weight. The adhesive composition for polarizing plates can therefore have high adhesion and durability with a sufficiently small amount of diluting solvent, thereby not only saving resources but also improving production efficiency.

The reason why an adhesive composition for polarizing plates according to the present invention has high adhesion and durability at a suitable viscosity is that a (meth)acrylic polymer in the adhesive composition for polarizing plates has a weight-average molecular weight in the specific range described above and that the (meth)acrylic polymer is crosslinked with a cross-linker and a cross-linking accelerator in the adhesive composition for polarizing plates. While (meth)acrylic polymers used in existing adhesive compositions for polarizing plates are rigid polymers having high hardness, a (meth)acrylic polymer in an adhesive composition for polarizing plates according to the present invention is a soft polymer, has high elasticity and has improved adhesion to glass, thereby sufficiently exhibiting high adhesion and durability required for an adhesive composition for polarizing plates.

Use of the acrylic monomer described above as the main component of an adhesive composition in the present invention obviates the need to use a low-molecular-weight monomer as described in Patent Document 2, ensuring essential characteristics (such as durability) required for an adhesive composition.

Examples of a cross-linker constituting an adhesive composition for polarizing plates according to the present invention include isocyanate cross-linkers, epoxy cross-linkers, amine curing agents and metal chelate cross-linkers.

Examples of the isocyanate cross-linkers include tolylene diisocyanate, naphthylene-1,5-diisocyanate, diphenylmethane diisocyanate, hexamethylene diisocyanate, isophorone diisocyanate, xylene diisocyanate and trimethylolpropane-modified tolylene diisocyanate.

Examples of the epoxy cross-linkers include N,N,N',N'-tetraglycidyl-m-xylenediamine, bisphenol A and polyethylene glycol glycidyl ether.

Examples of the amine curing agents include N,N,N',N'-tetramethylhexamethylenediamine.

Examples of the metal chelate cross-linkers include metallic compounds such as Al, Ni and Zn. These may be used alone or in combination.

Among these cross-linkers, in the present invention, isocyanate cross-linkers are preferably used, and xylene diisocyanate is particularly preferred.

When an isocyanate cross-linker is used, the amount of isocyanate cross-linker may generally range from 0.05 to 0.5 parts by weight, preferably from 0.10 to 0.25 parts by weight, with respect to 100 parts by weight of the (meth)acrylic polymer. In the case of an epoxy cross-linker, an amine curing agent, or a metal chelate cross-linker, 0.01 to 0.5 parts by weight may be generally used.

In the present invention, an adhesive composition for polarizing plates in which a component containing an acrylic polymer, a cross-linker and a curing accelerator is dissolved in an organic solvent is used to form an adhesive layer for polarizing plates.

In the present invention, use of a curing accelerator in combination with a curing agent can decrease the time to fix such polarizing plate to a glass substrate.

In an adhesive composition for polarizing plates according to the present invention, examples of the cross-linking accelerators include tin metallic compounds, zinc metallic compounds, amine compounds, titanium metallic compounds, bismuth metallic compounds and aluminum metallic compounds. Among them, tin metallic compounds are preferably used.

Specific examples of the tin metallic compounds serving as cross-linking accelerators include quadrivalent and bivalent organotin compounds such as dibutyltin dilaurate, bisacetylacetonato-dibutyltin, dibutyltin dimaleate and tin dimaleate.

Examples of the zinc metallic compounds include zinc oxide, zinc ammonium carbonate, zinc stearate, zinc naphthenate and 2-ethylhexane zinc.

Use of the acrylic monomer described above as the main component of an adhesive composition in the present invention obviates the need to use a low-molecular-weight monomer as described in Patent Document 2, ensuring essential characteristics (such as durability) required for an adhesive composition for polarizing plates.

Examples of the amine compounds include compounds having a basic amino group, such as triethylamine, trimethylamine, aniline and para-toluidine.

Examples of the titanium metallic compounds include tetrapropoxytitanium, tetrabutoxytitanium, dimethyldimethoxytitanium and dibutyltitanium.

Examples of the bismuth metallic compounds include organic bismuth compounds such as dibutylbismuth dilaurate and bisacetylacetonato dibutylbismuth.

These cross-linking accelerators may be used alone or in combination.

The amount of cross-linking accelerator may usually range from 0.01 to 0.5 parts by weight, preferably from 0.05 to 0.2 parts by weight, based on 100 parts by weight of the (meth)acrylic polymer.

The combined use of such a curing accelerator allows an unreacted functional group in a (meth)acrylic polymer to immediately react with an unreacted isocyanate group.

In this case, the reaction rate greatly depends on the curing accelerator used.

In particular, a tin metal curing accelerator has a high curing acceleration effect which is much higher than the curing acceleration effect of other curing accelerators.

In general, when a curing accelerator is used, an adhesive composition is applied to a substrate with detachability, an organic solvent is then removed, and an adhesive layer is generally transferred on a surface of a polarizing plate. When a tin curing accelerator is used, however, a curing reaction rapidly proceeds before an adhesive layer is transferred on a surface of a polarizing plate. In some cases, therefore, an adhesive composition for polarizing plates according to the present invention is preferably directly applied to a surface of a polarizing plate.

The effects of such curing accelerator can be determined by measuring the gel fraction of a resin forming an adhesive layer.

When an organic tin containing compound, which is a preferred curing accelerator in the present invention, particularly a tin compound having an alkyl group is used, preferably, an adhesive layer is formed on at least one side of a polarizing plate, wherein temporal changes in the gel fraction of an adhesive forming the adhesive layer satisfy the following conditions:

(a) the gel fraction 10 hours after the formation of the adhesive layer is 30% or more, preferably 50% or more, more preferably 60% or more, (b) the difference in gel fraction between 10 hours and three days after the formation of the adhesive layer is 15% or less, and (c) the difference in gel fraction between 24 hours and 30 days after the formation of the adhesive layer is 5% or less.

This means that 10 to 24 hours after the formation of the adhesive layer the gel fraction of the adhesive layer becomes almost saturated, and a crosslinked structure has been rapidly formed such that a further increase in gel fraction can scarcely be expected thereafter.

Although the gel fraction 10 hours after the formation of the adhesive layer should be 30% or more, taking heat resistance into consideration, the gel fraction is preferably 50% or more, more preferably 60% or more.

Thus, using a suitable tin metal curing accelerator allows a polarizing plate to be securely fixed to a liquid-crystal glass substrate in an curing time in the range of approximately 10 to 24 hours. Furthermore, if a polarizing plate is inappropriately fixed to a liquid-crystal glass substrate, the polarizing plate having an adhesive layer can be peeled and refixed without damaging the liquid-crystal glass substrate because a required curing time has passed.

Such a tin metal curing accelerator is preferably an organic tin compound, particularly a compound represented by the following formula [II-1] or [II-2].

[Formula 4]

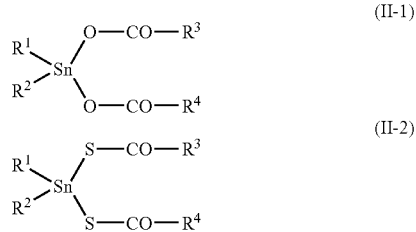

In the formulae (II-1) and (II-2), $R^1$ and $R^2$ independently denote an alkyl group having 1 to 18 carbon atoms, and $R^3$ and $R^4$ independently denote a hydrocarbon group having 1 to 20 carbon atoms or —$(CH2)_m$—COO—$R^5$ (wherein $R^5$ denotes a hydrocarbon group having 1 to 16 carbon atoms, and m denotes 0 or an integer in the range of 1 to 3). A hydrogen atom directly bound to the alkyl group or the hydrocarbon group may be substituted by another monovalent group or atom. $R^1$ and $R^2$ or $R^3$ and $R^4$ may cooperatively form a ring structure. $R^1$, $R^2$, $R^3$, and $R^4$ may have an unsaturated bond.

Examples of compounds represented by the formula (II-1) or (II-2) include dibutyltin octoate, dibutyltin dioleylmaleate, dibutyltin dibutylmaleate, dibutyltin dilaurate, 1,1,3,3-tetrabutyl-1,3-dilauryloxycarbonyl-distannixane, dibutyltin diacetate, dibutyltin diacetylacetonate, dibutyltin bis(o-phenylphenoxite), dibutyltin bis(triethoxysilicate), dibutyltin distearate, dioctyltin distearate, dioctyltin dilaurate, dioctyltin diacetate, dioctyltin diversatate, dibutyltin bis(isononyl 3-mercaptopropionate), dibutyltin bis(isooctyl thioglycol), dimethyltin bis(isooctyl thioglycol), dioctyltin bis(isooctyl thioglycol) and dilauryltin bis(octyl thioglycol). In addition to the groups represented by the formulae (II-1) and (II-2), dibutyltin oxide may be used. In particular, in the present invention, in consideration of generation of a lazy gel fraction of an adhesive composition in adhesive coating, a compound having two sulfur atoms bound to a tin atom is preferably used, and a compound having two groups of —S—CO—$R^6$ (wherein $R^6$ denotes a hydrocarbon group having 1 to 8 carbon atoms) bound to a tin atom and two alkyl groups bound to a tin atom is particularly preferred. An adhesive composition for polarizing plates according to the present invention that contains such a compound requires substantially no curing and, in a very short period of time after the adhesive composition is directly applied to a polarizing plate, the polarizing plate having an adhesive layer can be attached to a glass plate.

When a compound represented by the formula (II-1) or (II-2) is used as a curing accelerator, the gel fraction becomes saturated in a short period of time and satisfies the conditions (a) to (c).

Attaching a polarizing plate to a glass substrate using such compound results in high heat resistance, humidity and heat resistance and reworkability, and prevents light leakage.

In such adhesive composition for polarizing plates according to the present invention, high elasticity and flexibility of the adhesive composition for polarizing plates allow internal stress caused by adhesion to be relieved, strain often generated between an adherend and an adhesive layer under harsh operating environments of display apparatuses to be sufficiently reduced, and high adhesion required for an adhesive to be maintained. The adhesive composition for polarizing plates also has an effect of reducing light leakage caused by strain generated between an adherend such as a polarizing plate or a glass substrate and an adhesive layer.

In such adhesive composition for polarizing plates, when the adhesive composition is detached from an adherend such as a glass substrate, an adhesive is less liable to remain on the adherend. That is, the adhesive composition has excellent reworkability. Thus, the adhesive composition is best suited for an adhesive composition for polarizing plates.

In addition to the components described above, an adhesive composition for polarizing plates according to the present invention may contain another known additive agent. For example, a colorant, a powder such as pigment, dye, a surfactant, a plasticizer, a surface lubricant, a leveling agent, a softener, an antioxidant, an age resister, a light stabilizer, an ultraviolet absorber, a polymerization inhibitor, an inorganic or organic filler, a metal powder, particulates and foil can be appropriately added to the adhesive composition for each application. The amount of additive agent must be controlled so as not to considerably alter the modulus of elasticity of an adhesive layer.

Such (meth)acrylic polymer is a liquid having a moderate viscosity when the (meth)acrylic polymer contains solvent or has a resin content of 100%. For example, a solution containing 30% by weight of (meth)acrylic polymer dissolved in 70% by weight of ethyl acetate has a viscosity in the range of 0.5 to 10.0 Pa·s measured at 23° C. Thus, the (meth)acrylic polymer can provide sufficient coating performance with less solvent than the amount of solvent used in conventional polymers.

The polymer is cured by blending a curing agent and other components and allowing them to react. The cured polymer has elasticity and flexibility. In a (meth)acrylic polymer that has a constitutional repeating unit derived from such a monomer unit as described above and has, at an end of the polymer, a component unit derived from an alkoxysilyl group containing thiol compound, a reactive silyl group derived from the formula [B] introduced into the main chain and the alkoxysilyl group introduced to the end of the molecule have high reactivity. This (meth)acrylic polymer can be cured by a self-condensation reaction, a condensation cross-linking reaction or a combination of a self-condensation reaction and a condensation cross-linking reaction.

Since the cured polymer is preferably produced by bulk polymerization or solution polymerization, the cured polymer is free from hydrophilic components such as a dispersant and a surfactant, which are contained in polymers produced by emulsion polymerization and dispersion polymerization. The cured polymer therefore has excellent water resistance, and this excellent water resistance changes little over time. In a copolymer according to the present invention, an organometallic compound represented by the formula [I] used as a catalyst, an organic metal constituting the organometallic compound, a compound in which the organic metal is bound to another component, or a metal remains in an amount corresponding to the amount of catalyst used. The organometallic compound, a metal or a compound containing this metal can be removed by common deashing such as by dissolving the resulting polymer in an organic solvent to separate the organometallic compound. However, the organometallic compound does not function as an effective catalyst in the absence of an alkoxysilyl group containing thiol compound, and the amount of organometallic compound is very small. It is therefore not necessary to separate the organometallic compound. If necessary, the organometallic compound may be removed by deashing.

A release liner used in the present invention is a film of polyester or polyolefin, preferably polyethylene or polyethylene terephthalate, one side of which is preferably treated to be releasable.

As described above, a polarizing plate having an adhesive layer according to the present invention formed using the adhesive composition described above has an adhesive layer formed using the adhesive composition on at least one side of the polarizing plate. The adhesive composition contains a (meth)acrylic polymer, a cross-linker and a cross-linking accelerator in an organic solvent. The (meth)acrylic polymer is formed by copolymerization of monomers containing an alkyl (meth)acrylate, a hydroxyl group containing monomer and/or a carboxyl group containing monomer.

A solution containing 30% by weight of (meth)acrylic polymer which constitutes an adhesive composition according to the present invention, dissolved in 70% by weight of ethyl acetate has a viscosity in the range of 0.5 to 10.0 Pa·s measured at 23° C. The (meth)acrylic polymer having a weight-average molecular weight in the range of 300,000 to 900,000 is crosslinked with an isocyanate cross-linker in the presence of the cross-linking accelerator. The adhesive composition contains 25 to 60% by weight of non-volatile matter, and the adhesive layer is formed on at least one side of the polarizing plate.

A polarizing plate having an adhesive layer according to the present invention has an adhesive layer formed using an adhesive composition on at least one side of the polarizing plate. In the adhesive composition, an acrylic polymer, a tin compound having a dialkyl group and serving as a cross-linking accelerator, and an isocyanate cross-linker are dissolved in an organic solvent. The acrylic polymer is formed by copolymerization of monomers containing an alkyl (meth) acrylate, a hydroxyl group containing monomer and/or a carboxyl group containing monomer.

Preferably, a solution containing 30% by weight of acrylic polymer which constitutes an adhesive composition according to the present invention, dissolved in 70% by weight of ethyl acetate has a viscosity in the range of 0.5 to 10.0 Pa·s measured at 23° C., the acrylic polymer has a weight-average molecular weight in the range of 300,000 to 700,000, and an adhesive layer is formed on at least one side of the polarizing plate, in which temporal changes in the gel fraction of an adhesive forming the adhesive layer formed by the application of the adhesive composition satisfy the following conditions:

(a) the gel fraction 10 hours after the formation of the adhesive layer is 30% or more, (b) the difference in gel fraction between 10 hours and three days after the formation of the adhesive layer is 15% or less, and (c) the difference in gel fraction between 24 hours and 30 days after the formation of the adhesive layer is 5% or less.

The adhesive layer thus formed has an average thickness generally in the range of 10 to 50 μm, preferably in the range of 15 to 30 μm.

As described above, a polarizing plate having an adhesive according to the present invention has high heat resistance, humidity and heat resistance and reworkability, and prevents light leakage.

The gel fraction increases rapidly and becomes almost saturated in 10 hours after the formation of an adhesive layer, and increases little thereafter.

In a polarizing plate having an adhesive layer according to the present invention, using an adhesive composition or an adhesive film, an adhesive layer is formed on one side or both sides of a polarizing plate such as a polarizing film, a retardation film, an antireflection film or a brightness-enhancement film. Among them, a polarizing film is particularly preferred because the polarizing film can exhibit higher stress relaxation. After the adhesive film for use in polarizing plates is attached to one side or both sides of a polarizing plate under pressure, the polarizing plate is left still at a temperature in the range of 20 to 50° C. and a humidity in the range of 30 to 70% to produce a polarizing plate having an adhesive layer. Because of the above-mentioned characteristics of an adhesive composition for polarizing plates according to the present invention, such polarizing plate having an adhesive layer can sufficiently reduce light leakage.

In the present invention, utilizing such specific characteristics of the polymer, the polymer is used as an adhesive for polarizing plates, the adhesive is applied to at least one side of a polarizing plate to form an adhesive layer, providing a polarizing plate having an adhesive layer. Such adhesive has high adhesion and durability required for an adhesive for polarizing plates and can maintain these characteristics even at high temperature and high humidity. Such adhesive therefore has an excellent effect of sufficiently reducing light leakage caused by strain generated between an adherend such as a polarizing plate, and an adhesive layer, resulting from the contraction of the polarizing plate.

The adhesive layer is formed of a film of an adhesive composition for polarizing plates according to the present invention. The adhesive composition for polarizing plates is applied to a release liner with a known coater (such as a comma coater, a Mayer bar coater, a die coater, a lip coater or a gravure coater) and is dried at a temperature usually in the range of 70 to 130° C. to produce an adhesive sheet composed of the adhesive layer and the release liner. The adhesive layer has a thickness usually in the range of 10 to 50 μm, preferably in the range of 15 to 30 μm. An adhesive composition for polarizing plates may be directly applied to a surface of a polarizing plate instead of employing the transferring process described above.

EXAMPLES

The present invention will be described in more detail below with reference to Examples. However, the present invention is not limited to these Examples.

The percentage of polymerization, the weight-average molecular weight and the number-average molecular weight of a (meth)acrylic polymer were measured in accordance with the following conditions.

<Percentage of Polymerization>

The percentage of polymerization (% by weight) was calculated from the amount of residual monomer determined by gas chromatography (manufactured by Shimadzu Co., type: GC-1700).

<Weight-Average Molecular Weight (Mw) and Number-Average Molecular Weight (Mn)>

The weight-average molecular weight (Mw) and the number-average molecular weight (Mn) were measured by gel permeation chromatography (GPC) using the following measuring apparatus and GPC column.

Measuring apparatus: HLC-8120GPC (manufactured by Tosoh Co.)

GPC column structure: a series of five columns (manufactured by Tosoh Co.)
(1) TSK-GEL $H_{XL}$-H (guard column)
(2) TSK-GEL G7000$H_{XL}$
(3) TSK-GEL GMH$_{XL}$
(4) TSK-GEL GMH$_{XL}$
(5) TSK-GEL G2500$H_{XL}$ Sample concentration: 1.0 mg/cm$^3$ (diluted with tetrahydrofuran)

Mobile phase solvent: tetrahydrofuran

Flow rate: 1.0 cm$^3$/min

Column temperature: 40° C.

<Viscosity>

An ethyl acetate solution was prepared by adding ethyl acetate to the resulting solution containing a (meth)acrylic polymer such that the amounts of (meth)acrylic polymer and ethyl acetate were substantially 30% by weight and 70% by weight, respectively (hereinafter referred to simply as an ethyl acetate solution).

The viscosity (unit: Pa·s) of the resulting ethyl acetate solution measured in accordance with JIS K6833 6.3 using a BM type viscometer (manufactured by Toki Sangyo Co., Ltd., rotor No. 4) at 23° C. was considered as the viscosity of the solution containing a (meth)acrylic polymer.

Production Example A-1

95 Parts by weight of butyl acrylate (BA), 4 parts by weight of 2-hydroxyethyl acrylate (2HEA), 1 part by weight of acrylic acid (AA), 50 parts by weight of ethyl acetate and 0.001 part by weight of zirconocene dichloride which was an organometallic compound represented by the formula [I], were charged into a reaction apparatus equipped with an agitator, a nitrogen gas inlet pipe, a reflux condenser tube and a thermometer. The mixture in the reaction apparatus was heated to 85° C. while nitrogen was introduced into the reaction apparatus.

As a thiol compound, 0.05 parts by weight of γ-mercaptopropyltrimethoxysilane (manufactured by Shin-Etsu Chemical Co., Ltd., trade name: KBM-803) was added to the mixture with stirring. The mixture in the reaction apparatus was then stirred for four hours while the internal temperature of the reaction apparatus was kept at 85° C. 110 Parts by weight of ethyl acetate was added as a diluting solvent to the mixture to prepare a solution containing a (meth)acrylic polymer.

The (meth)acrylic polymer in the solution containing a (meth)acrylic polymer had a percentage of polymerization of 80%, Mw of 517,000 and Mn of 149,000. The ethyl acetate solution had a viscosity of 2.9 Pa·s at 23° C.

Production Example A-2

99 Parts by weight of butyl acrylate (BA), 1 part by weight of 4-hydroxybutyl acrylate (4HBA), 50 parts by weight of ethyl acetate and 0.001 part by weight of zirconocene dichloride which was an organometallic compound represented by the formula [I], were charged into a reaction apparatus equipped with an agitator, a nitrogen gas inlet pipe, a reflux condenser tube and a thermometer. The mixture in the reaction apparatus was heated to 85° C. while nitrogen was introduced into the reaction apparatus.

0.05 Parts by weight of γ-mercaptopropyltrimethoxysilane was then added to the mixture with stirring. The mixture in the reaction apparatus was then stirred for four hours while the internal temperature of the reaction apparatus was kept at 85° C. 80 Parts by weight of ethyl acetate was added as a diluting solvent to the mixture to prepare a solution containing a (meth)acrylic polymer.

The (meth)acrylic polymer in the solution containing a (meth)acrylic polymer had a percentage of polymerization of 82%, Mw of 501,000 and Mn of 142,000. The ethyl acetate solution had a viscosity of 2.7 Pa·s at 23° C.

Production Example A-3

A solution containing a (meth)acrylic polymer was prepared in the same way as Production Example A-1 except that 96 parts by weight of butyl acrylate (BA) and 4 parts by weight of acrylic acid (AA) were used.

The (meth)acrylic polymer in the solution containing a (meth)acrylic polymer had a percentage of polymerization of 83%, Mw of 521,000 and Mn of 151,000. The ethyl acetate solution had a viscosity of 3.0 Pa·s at 23° C.

Production Example A-4

A solution containing a (meth)acrylic polymer was prepared in the same way as Production Example A-1 except that the amount of γ-mercaptopropyltrimethoxysilane was 0.08 parts by weight and that a diluting solvent was not added after polymerization.

The (meth)acrylic polymer in the solution containing a (meth)acrylic polymer had a percentage of polymerization of 80%, Mw of 330,000 and Mn of 125,000. The ethyl acetate solution had a viscosity of 0.6 Pa·s at 23° C.

Production Example A-5

A solution containing a (meth)acrylic polymer was prepared in the same way as Production Example A-1 except that the amount of γ-mercaptopropyltrimethoxysilane was 0.02 parts by weight.

The (meth)acrylic polymer in the solution containing a (meth)acrylic polymer had a percentage of polymerization of 81%, Mw of 880,000 and Mn of 291,000. The ethyl acetate solution had a viscosity of 7.7 Pa·s at 23° C.

Production Example A-6

95 Parts by weight of butyl acrylate (BA), 4 parts by weight of 2-hydroxyethyl acrylate (2HEA), 1 part by weight of acrylic acid (AA), 50 parts by weight of ethyl acetate and 0.001 part by weight of zirconocene dichloride which was an organometallic compound represented by the formula [I], were charged into a reaction apparatus equipped with an agitator, a nitrogen gas inlet pipe, a reflux condenser tube and a thermometer. The mixture in the reaction apparatus was heated to 85° C. while nitrogen was introduced into the reaction apparatus.

0.05 Parts by weight of γ-mercaptopropyltrimethoxysilane was then added to the mixture with stirring. The mixture in the reaction apparatus was then stirred for four hours while the internal temperature of the reaction apparatus was kept at 85° C. As an initiator, 0.1 part by weight of 2,2'-azobisisobutyric acid dimethyl ester was added to the mixture, and the mixture was stirred for another two hours. After stirring, 110 parts by weight of ethyl acetate was added as a diluting solvent to prepare a solution containing a (meth)acrylic polymer.

The (meth)acrylic polymer in the solution containing a (meth)acrylic polymer had a percentage of polymerization of 98%, Mw of 490,000 and Mn of 89,000. The ethyl acetate solution had a viscosity of 2.7 Pa·s at 23° C.

Production Example A-7

95 Parts by weight of butyl acrylate (BA), 4 parts by weight of 2-hydroxyethyl acrylate (2HEA), 1 part by weight of acrylic acid (AA) and 0.001 part by weight of zirconocene dichloride which was an organometallic compound represented by the formula [I], were charged into a reaction apparatus equipped with an agitator, a nitrogen gas inlet pipe, a reflux condenser tube and a thermometer. The mixture in the reaction apparatus was heated to 85° C. while nitrogen was introduced into the reaction apparatus.

0.1 Parts by weight of γ-mercaptopropyltrimethoxysilane was then added to the mixture with stirring. The mixture in the reaction apparatus was then stirred for one hour while the internal temperature of the reaction apparatus was kept at 85° C. 50 Parts by weight of ethyl acetate was added dropwise for one hour, and the mixture was stirred for another two hours. As a diluting solvent, 110 parts by weight of ethyl acetate was then added to prepare a solution containing a (meth)acrylic polymer.

The (meth)acrylic polymer in the solution containing a (meth)acrylic polymer had a percentage of polymerization of 72%, Mw of 509,000 and Mn of 170,000. The ethyl acetate solution had a viscosity of 2.8 Pa·s at 23° C.

Production Example A-8

A solution containing a (meth)acrylic polymer was prepared in the same way as Production Example A-1 except that γ-mercaptopropyltrimethoxysilane was substituted by 0.05 parts by weight of γ-mercaptopropylmethyldimethoxysilane (manufactured by Shin-Etsu Chemical Co., Ltd., trade name: KBM-802).

The (meth)acrylic polymer in the solution containing a (meth)acrylic polymer had a percentage of polymerization of 80%, Mw of 505,000 and Mn of 139,000. The ethyl acetate solution had a viscosity of 2.8 Pa·s at 23° C.

Production Example A-9

95 Parts by weight of butyl acrylate (BA), 4 parts by weight of 2-hydroxyethyl acrylate (2HEA), 1 part by weight of acrylic acid (AA) and 200 parts by weight of ethyl acetate were charged into a reaction apparatus equipped with an agitator, a nitrogen gas inlet pipe, a reflux condenser tube and a thermometer. The mixture in the reaction apparatus was heated to 66° C. while nitrogen was introduced into the reaction apparatus.

As an initiator, 0.05 parts by weight of 2,2'-azobisisobutyric acid dimethyl ester was then added to the mixture with stirring. The mixture in the reaction apparatus was then stirred for four hours while the internal temperature of the reaction apparatus was kept at 66° C. 200 Parts by weight of ethyl acetate was added as a diluting solvent to the mixture to prepare a solution containing a (meth)acrylic polymer.

The (meth)acrylic polymer in the solution containing a (meth)acrylic polymer had a percentage of polymerization of 81%, Mw of 1,540,000 and Mn of 75,000. The percentage of the (meth)acrylic polymer in the solution containing a (meth)acrylic polymer was 20% by weight. The solution had a viscosity of 15.6 Pa·s at 23° C.

Production Example A-10

95 Parts by weight of butyl acrylate (BA), 4 parts by weight of 2-hydroxyethyl acrylate (2HEA), 1 part by weight of acrylic acid (AA), 0.05 parts by weight of γ-mercaptopropyltrimethoxysilane as a thiol compound and 50 parts by weight of ethyl acetate were charged into a reaction apparatus equipped with an agitator, a nitrogen gas inlet pipe, a reflux condenser tube and a thermometer. The mixture in the reaction apparatus was heated to 70° C. while nitrogen was introduced into the reaction apparatus.

As an initiator, 0.1 part by weight of 2,2'-azobisisobutyric acid dimethyl ester was then added to the mixture with stirring. The mixture in the reaction apparatus was then stirred for four hours while the internal temperature of the reaction apparatus was kept at 70° C. 110 Parts by weight of ethyl acetate was added as a diluting solvent to the mixture to prepare a solution containing a (meth)acrylic polymer.

The (meth)acrylic polymer in the solution containing a (meth)acrylic polymer had a percentage of polymerization of 82%, Mw of 520,000 and Mn of 150,000. The ethyl acetate solution had a viscosity of 3.0 Pa·s at 23° C.

Production Example A-11

95 Parts by weight of butyl acrylate (BA), 4 parts by weight of 2-hydroxyethyl acrylate (2HEA), 1 part by weight of acrylic acid (AA), 0.06 parts by weight of γ-acryloxypropyltrimethoxysilane (manufactured by Shin-Etsu Chemical Co., Ltd., trade name: KBM-5103) as a silyl group containing monomer, and 50 parts by weight of ethyl acetate were charged into a reaction apparatus equipped with an agitator, a nitrogen gas inlet pipe, a reflux condenser tube and a thermometer. The mixture in the reaction apparatus was heated to 70° C. while nitrogen was introduced into the reaction apparatus.

As an initiator, 0.1 part by weight of 2,2'-azobisisobutyric acid dimethyl ester was then added to the mixture with stirring. The mixture in the reaction apparatus was then stirred for four hours while the internal temperature of the reaction apparatus was kept at 70° C. 110 Parts by weight of ethyl acetate was added as a diluting solvent to the mixture to prepare a solution containing a (meth)acrylic polymer.

The (meth)acrylic polymer in the solution containing a (meth)acrylic polymer had a percentage of polymerization of 84%, Mw of 515,000 and Mn of 144,000. The ethyl acetate solution had a viscosity of 2.9 Pa·s at 23° C.

Production Example A-12

A solution containing a (meth)acrylic polymer was prepared in the same way as Production Example A-1 except that the amount of butyl acrylate (BA) was 95 parts by weight, the amount of 2-hydroxyethyl acrylate (2HEA) was 4 parts by weight, the amount of acrylic acid (AA) was 1 part by weight and the amount of γ-mercaptopropyltrimethoxysilane was 0.01 part by weight.

The (meth)acrylic polymer in the solution containing a (meth)acrylic polymer had a percentage of polymerization of 71%, Mw of 1,320,000 and Mn of 432,000. The ethyl acetate solution had a viscosity of 25.0 Pa·s at 23° C.

Production Example A-13

A solution containing a (meth)acrylic polymer was prepared in the same way as Production Example A-1 except that the amount of butyl acrylate (BA) was 95 parts by weight, the amount of 2-hydroxyethyl acrylate (2HEA) was 4 parts by weight, the amount of acrylic acid (AA) was 1 part by weight and the amount of γ-mercaptopropyltrimethoxysilane was 0.15 parts by weight.

The (meth)acrylic polymer in the solution containing a (meth)acrylic polymer had a percentage of polymerization of 85%, Mw of 256,000 and Mn of 88,000. The ethyl acetate solution had a viscosity of 0.2 Pa·s at 23° C.

Production Example A-14

A solution containing a (meth)acrylic polymer was prepared in the same way as Production Example A-1 except that γ-mercaptopropyltrimethoxysilane was substituted by 0.05 parts by weight of 2-mercaptoethanol.

The (meth)acrylic polymer in the solution containing a (meth)acrylic polymer had a percentage of polymerization of 83%, Mw of 498,000 and Mn of 164,000. The ethyl acetate solution had a viscosity of 3.3 Pa·s at 23° C.

Table 1 shows the amounts of components in the production of these (meth)acrylic polymers and measurement results of the percentages of polymerization, Mw and Mn of the (meth)acrylic polymers.

TABLE 1

| | (Meth)acrylate monomer | Hydroxyl group-containing monomer | | Carboxyl group-containing monomer | Thiol compound | | | Silyl group-containing monomer | Organometallic compound |
|---|---|---|---|---|---|---|---|---|---|
| | BA | 2HEA | 4HBA | AA | KBM-803 | KBM-802 | 2-mercaptoethanol | KBM-5103 | Zirconocene dichloride |
| Production example A-1 | 95 | 4 | — | 1 | 0.05 | — | — | — | 0.001 |
| Production example A-2 | 99 | — | 1 | — | 0.05 | — | — | — | 0.001 |
| Production example A-3 | 96 | — | — | 4 | 0.05 | — | — | — | 0.001 |
| Production example A-4 | 95 | 4 | — | 1 | 0.08 | — | — | — | 0.001 |
| Production example A-5 | 95 | 4 | — | 1 | 0.02 | — | — | — | 0.001 |
| Production example A-6 | 95 | 4 | — | 1 | 0.05 | — | — | — | 0.001 |
| Production example A-7 | 95 | 4 | — | 1 | 0.10 | — | — | — | 0.001 |
| Production example A-8 | 95 | 4 | — | 1 | — | 0.05 | — | — | 0.001 |
| Production example A-9 | 95 | 4 | — | 1 | — | — | — | — | — |
| Production example A-10 | 95 | 4 | — | 1 | 0.05 | — | — | — | — |
| Production example A-11 | 95 | 4 | — | 1 | — | — | — | 0.06 | — |
| Production example A-12 | 95 | 4 | — | 1 | 0.01 | — | — | — | 0.001 |
| Production example A-13 | 95 | 4 | — | 1 | 0.15 | — | — | — | 0.001 |
| Production example A-14 | 95 | 4 | — | 1 | — | — | 0.05 | — | 0.001 |

| | Polymerization initiator 2,2'-azobisisobutyric acid dimethyl ester | Reaction solvent (ethyl acetate) | | Percentage of polymerization | Mw | Mn | Viscosity at 23° C. (Pa · s) |
|---|---|---|---|---|---|---|---|
| | | Before initiation of polymerization | After initiation of polymerization | | | | |
| Production example A-1 | — | 50 | 110 | 80 | 517,000 | 149,000 | 2.9 |
| Production example A-2 | — | 50 | 80 | 82 | 501,000 | 142,000 | 2.7 |
| Production example A-3 | — | 50 | 110 | 83 | 521,000 | 151,000 | 3.0 |
| Production example A-4 | — | 50 | 0 | 80 | 330,000 | 125,000 | 0.6 |
| Production example A-5 | — | 50 | 110 | 81 | 880,000 | 291,000 | 7.7 |
| Production example A-6 | 0.1 (Later addition) | 50 | 150 | 98 | 490,000 | 89,000 | 2.7 |
| Production example A-7 | — | 0 | 160 | 72 | 509,000 | 170,000 | 2.8 |
| Production example A-8 | — | 50 | 110 | 80 | 505,000 | 139,000 | 2.8 |
| Production example A-9 | 0.05 | 200 | 200 | 81 | 1,540,000 | 75,000 | 15.6*[1] |
| Production example A-10 | 0.1 | 50 | 110 | 82 | 520,000 | 150,000 | 3.0 |
| Production example A-11 | 0.1 | 50 | 110 | 84 | 515,000 | 144,000 | 2.9 |

TABLE 1-continued

| | | | | | | | |
|---|---|---|---|---|---|---|---|
| Production example A-12 | — | 50 | 110 | 71 | 1,320,000 | 432,000 | 25.0 |
| Production example A-13 | — | 50 | 110 | 85 | 256,000 | 88,000 | 0.2 |
| Production example A-14 | — | 50 | 110 | 83 | 498,000 | 164,000 | 3.3 |

In Table 1 described above, the blending amount of each component is expressed in parts by weight. Furthermore, *1: the viscosity in Production Example A-9 is a measured value for 20% by weight of acrylic polymer.

Production Example B-1

96.8 Parts by weight of butyl acrylate (BA), 3 parts by weight of 2-hydroxyethyl acrylate (2HEA), 0.2 parts by weight of acrylic acid (AA), 120 parts by weight of ethyl acetate and 0.04 parts by weight of normal dodecyl mercaptan were charged into a flask equipped with an agitator, a nitrogen gas inlet pipe, a thermometer and a reflux condenser tube. The contents of the flask were heated to 66° C. while nitrogen gas was introduced into the flask.

0.1 Part by weight of a polymerization initiator (manufactured by Wako Pure Chemical Industries, Ltd., azo catalyst; V-601) was then added with stirring to the flask sufficiently purged with nitrogen gas. The contents of the flask were allowed to react for three hours while the temperature of the contents was kept at 67° C. The contents of the flask were then heated to 78° C. and were allowed to react for one hour. After the reaction, 30 parts by weight of ethyl acetate was added.

The resulting (meth)acrylic polymer (a) had a Mw of 503,000 and a Mn of 125,000, and the ethyl acetate solution had a viscosity of 3.1 Pa·s at 23° C.

Production Example B-2

80.8 Parts by weight of butyl acrylate, 16 parts by weight of benzyl acrylate (Be-A), 3 parts by weight of 2-hydroxyethyl acrylate, 0.2 parts by weight of acrylic acid, 120 parts by weight of ethyl acetate and 0.04 parts by weight of normal dodecyl mercaptan were charged into a flask equipped with an agitator, a nitrogen gas inlet pipe, a thermometer, and a reflux condenser tube. The contents of the flask were heated to 66° C. while nitrogen gas was introduced into the flask.

The subsequent operations and reactions were performed in the same way as in Production Example B-1. The resulting (meth)acrylic polymer (b) had a Mw of 525,000 and a Mn of 134,000, and the ethyl acetate solution had a viscosity of 3.8 Pa·s at 23° C.

Production Example B-3

96.8 Parts by weight of butyl acrylate, 0.03 parts by weight of a silyl group containing monomer (3-methacryloxypropylmethyldimethoxysilane, manufactured by Shin-Etsu Chemical Co., Ltd., KBM-503), 3 parts by weight of 2-hydroxyethyl acrylate, 0.2 parts by weight of acrylic acid, 120 parts by weight of ethyl acetate and 0.04 parts by weight of normal dodecyl mercaptan were charged into a flask equipped with an agitator, a nitrogen gas inlet pipe, a thermometer and a reflux condenser tube. The contents of the flask were heated to 66° C. while nitrogen gas was introduced into the flask.

The subsequent operations and reactions were performed in the same way as in Production Example B-1. The resulting (meth)acrylic polymer (c) had a Mw of 511,000 and a Mn of 147,000, and the ethyl acetate solution had a viscosity of 3.3 Pa·s at 23° C.

Production Example B-4

96.8 Parts by weight of butyl acrylate, 3 parts by weight of 2-hydroxyethyl acrylate, 0.2 parts by weight of acrylic acid, 120 parts by weight of ethyl acetate and 0.1 part by weight of normal dodecyl mercaptan were charged into a flask equipped with an agitator, a nitrogen gas inlet pipe, a thermometer and a reflux condenser tube. The contents of the flask were heated to 66° C. while nitrogen gas was introduced into the flask.

0.1 Part by weight of a polymerization initiator (V-601) was then added with stirring to the flask sufficiently purged with nitrogen gas. The contents of the flask were allowed to react for three hours while the temperature of the contents was kept at 67° C. The contents of the flask were then heated to 78° C. and were allowed to react for one hour. After the reaction, 30 parts by weight of ethyl acetate was added. The resulting (meth)acrylic polymer (d) had a Mw of 206,000 and a Mn of 45,000, and the ethyl acetate solution had a viscosity of 0.3 Pa·s at 23° C.

Production Example B-5

96.8 Parts by weight of butyl acrylate, 3 parts by weight of 2-hydroxyethyl acrylate, 0.2 parts by weight of acrylic acid and 120 parts by weight of ethyl acetate were charged into a flask equipped with an agitator, a nitrogen gas inlet pipe, a thermometer and a reflux condenser tube. The contents of the flask were heated to 66° C. while nitrogen gas was introduced into the flask.

0.07 Parts by weight of a polymerization initiator (V-601) was then added with stirring to the flask sufficiently purged with nitrogen gas. The contents of the flask were allowed to react for three hours while the temperature of the contents was kept at 67° C. The contents of the flask were then heated to 78° C. and were allowed to react for one hour. After the reaction, 100 parts by weight of ethyl acetate was added. The resulting (meth)acrylic polymer (e) had a Mw of 1,202,000 and a Mn of 165,000, and the ethyl acetate solution had a viscosity of 18.0 Pa·s at 23° C.

TABLE 2

|  | Monomer | | | | Silyl group-containing monomer | Polymerization initiator | n-decane | Reaction temperature | Average molecular weight | | Viscosity at 23° C. |
| --- | --- | --- | --- | --- | --- | --- | --- | --- | --- | --- | --- |
|  | BA | 2HEA | AA | Be-A | KBM503 | V-601 | mercaptan | (° C.) | Mw | Mn | (Pa/s) |
| Production example B-1 | 96.8 | 3 | 0.2 | — | — | 0.04 | 0.04 | 78 | 503000 | 125000 | 3.1 |
| Production example B-2 | 80.8 | 3 | — | 16 | — | 0.04 | 0.04 | 66 | 525000 | 134000 | 3.8 |
| Production example B-3 | 96.8 | 3 | — | — | 0.03 | 0.04 | 0.04 | 66 | 511000 | 147000 | 3.3 |
| Production example B-4 | 96.8 | 3 | 0.2 | — | — | 0.1 | 0.1 | 78 | 206000 | 4500 | 0.3 |
| Production example B-5 | 96.8 | 3 | 0.2 | — | — | 0.07 | — | 78 | 1202000 | 165000 | 18.0 |

Note)
In Table 2 described above, "KBM503" is a silyl group containing compound, 3-methacryloxypropylmethyldimethoxysilane, manufactured by Shin-Etsu Chemical Co., Ltd.

In the above Table 2, the polymerization initiator "V-601" is an azo catalyst, a compound name: 2,2'-azobisisobutyric acid dimethyl ester, manufactured by Wako Pure Chemical Industries, Ltd.

In Examples and Comparative Examples, the solutions containing a (meth)acrylic polymer prepared in Production Examples A-1 to A-14 and B-1 to B-5 were used to produce adhesive compositions for polarizing plates, and the physical properties were measured by the following methods.

<Non-volatile Matter Content of (Meth)acrylic Polymer>

In accordance with JIS K 6833 6.4, 1.0 to 1.5 g of an adhesive composition for polarizing plates was taken in an aluminum foil dish having a diameter of 50 mm and a height of 30 mm and was heated in a constant-temperature dry oven set at 105° C. for three hours to evaporate volatile matter. The weight of a residue was measured to calculate the percentage to the weight of the sample first taken (unit: % by weight).

In Examples and Comparative Examples, polarizing plates having an adhesive layer were fabricated and aged at conditions of 23° C. and 65% RH for seven days for Examples 1 to 12 and for time and date described in the following Tables 5 and 6 for Examples 13 to 18, Comparative Examples 13 to 18 and Comparative Examples 6 to 11. The polarizing plates were evaluated for adhesion, durability, reworkability and an ability to prevent light leakage on the following criteria.

<Adhesion>

A polarizing plate having an adhesive layer was cut into 25 mm width×150 mm length. After a polyethylene terephthalate release liner was removed, the polarizing plate was attached to a non-alkali glass plate (manufactured by Corning Inc., trade name: 1737, the same shall apply hereinafter). After the attachment, the polarizing plate was left to stand for 20 min. The adhesion (unit: N/25 mm) of the polarizing plate was then measured with a tensile tester (manufactured by Toyo Seiki Seisaku-Sho, Ltd., Model: Strograph-M1) at a peel rate of 300 mm/min and a peel angle of 180° in accordance with JIS Z 0237.

<Durability>

A polarizing plate having an adhesive layer was cut into 140 mm width×240 mm length. After a polyethylene terephthalate release liner was removed, the polarizing plate was attached to a surface of a non-alkali glass plate with a laminator. After the attachment, the polarizing plate was placed in an autoclave set at 50° C. and 0.5 MPa for 20 min and was left to stand at 85° C. and 60° C. and 95% RH for 500 hours. After that, the non-alkali glass plate to which the polarizing plate having an adhesive layer was attached was visually inspected to evaluate durability on the following criteria.

AA: No defective appearance such as foaming, peeling or cracking was observed.

BB: A few defective appearances such as foaming, peeling or cracking were observed.

CC: Distinct defective appearances such as foaming, peeling or cracking were observed.

<Reworkability>

An adhesive sheet was cut into 140 mm width×240 mm length. After a polyethylene terephthalate release liner was removed, the adhesive sheet was attached to a surface of a non-alkali glass plate with a laminator. After the attachment, the adhesive sheet was placed in an autoclave set at 50° C. and 0.5 MPa for 20 min, was left to stand at 70° C. for six hours, and was cooled to 23° C. The polarizing plate having an adhesive layer was then removed from the non-alkali glass plate at conditions of a peel rate of 300 mm/min and a peel angle of 180°. The surface of the non-alkali glass plate was visually inspected to evaluate reworkability on the following criteria.

AA: No contamination or residual adhesive was observed.

BB: Slight contamination or residual adhesive was observed.

CC: Distinct contamination or residual adhesive was observed.

<Ability to Prevent Light Leakage>

A polarizing plate having an adhesive layer was cut into 140 mm width×240 mm length. After a polyethylene terephthalate release liner was removed, the polarizing plate was attached to a non-alkali glass plate with a laminator under crossed nicols. After the attachment, the polarizing plate was placed in an autoclave set at 50° C. and 0.5 MPa for 20 min and was left to stand at 85° C. for 500 hours. The presence of light leakage was then visually inspected, and an ability to prevent light leakage was determined on the following criteria.

AA: No light leakage was observed.

BB: Slight light leakage was observed.

CC: Distinct light leakage was observed.

Example 1

An adhesive composition for polarizing plates (non-volatile matter content: 30.8% by weight) was prepared by mixing 0.1 part by weight of an isocyanate cross-linker (manufactured by Soken Chemical & Engineering Co., Ltd., trade name: TD-75, the same shall apply hereinafter), 0.03 parts by weight of a cross-linking accelerator (manufactured by Nitto Kasei Co., Ltd., trade name: Neostann U-340A (dibutyltin bisisononyl-3-mercaptopropionate), the same shall apply hereinafter) and 0.06 parts by weight of a silane coupling agent (manufactured by Soken Chemical & Engineering Co., Ltd., trade name: A-50, the same shall apply hereinafter) with respect to 100 parts by weight of the solution containing a (meth)acrylic polymer produced in Production Example A-1.

The resulting adhesive composition for polarizing plates was applied with a comma coater to a releasable surface of a polyethylene terephthalate release liner (manufactured by Mitsubishi Chemical Polyester Co., Ltd., trade name: MRF, thickness: 38 μm, the same shall apply hereinafter) such that the thickness of an adhesive layer was 25 μm after drying, and was dried for 60 seconds in a hot-air dryer (manufactured by Isuzu Seisakusho Co., Ltd.) set at 90° C. and an air volume of 10 m³/min. A polarizing film was then placed on an adhesive layer. The polarizing film and the adhesive layer were bonded together at a pressure of 0.2 MPa/m² to produce a roll of polarizing plate having an adhesive layer.

The polarizing plate having an adhesive layer was evaluated for adhesion, durability, reworkability, and an ability to prevent light leakage on the criteria described above. Table 3 shows the results.

The polarizing film was a three-layer film composed of an oriented polyvinyl alcohol film (thickness: 30 μm) dyed with iodine disposed between cellulose triacetate films (thickness: 80 μm).

Examples 2 to 12 and Comparative Examples 1 to 5

Adhesive compositions for polarizing plates were prepared by the method described in Example 1 except that the amounts of the components were those described in Table 2. The resulting adhesive composition for polarizing plates was used to produce a roll of polarizing plate having an adhesive layer by the method described in Example 1.

Table 2 shows the non-volatile matter contents of the adhesive compositions for polarizing plates and evaluation results of the polarizing plates having an adhesive layer.

In the case of adhesive compositions for polarizing plates prepared in Comparative Examples 1 and 4, a solution containing 30% by weight of (meth)acrylic polymer dissolved in 70% by weight of ethyl acetate had an excessively high viscosity, and therefore the adhesive composition could not be applied to a polyethylene terephthalate release liner. An adhesive composition for polarizing plates prepared in Comparative Example 2 contained an excessively small amount of non-volatile matter and hence could not be dried sufficiently. Removal of a release liner therefore caused a strong malodor resulting from volatile components (organic solvents and residual monomers).

TABLE 3

| | Adhesive composition for polarizing plates[*2] | | | | | Physical properties of composition |
|---|---|---|---|---|---|---|
| | (Meth)acrylic polymer[*3] | Cross-linker (TD-75) | Cross-linking accelerator (U-340A)[*4] | Diluting solvent (ethyl acetate) | Silane coupling agent (A-50) | Non-volatile matter content (% by weight) |
| Example 1 | Production example 1 | 0.2 | 0.1 | — | 0.2 | 30.8 |
| Example 2 | Production example 1 | 0.2 | 0.1 | — | — | 30.8 |
| Example 3 | Production example 2 | 0.2 | 0.1 | — | 0.2 | 35.7 |
| Example 4 | Production example 3 | 0.2 | 0.1 | — | 0.2 | 30.4 |
| Example 5 | Production example 4 | 0.2 | 0.1 | — | 0.2 | 53.0 |
| Example 6 | Production example 5 | 0.2 | 0.1 | 50 | 0.2 | 25.9 |
| Example 7 | Production example 6 | 0.2 | 0.1 | — | 0.2 | 30.9 |
| Example 8 | Production example 7 | 0.2 | 0.1 | — | 0.2 | 31.2 |
| Example 9 | Production example 8 | 0.2 | 0.1 | — | 0.2 | 32.8 |
| Example 10 | Production example 10 | 0.2 | 0.1 | — | 0.2 | 30.9 |
| Example 11 | Production example 11 | 0.2 | 0.1 | — | 0.2 | 29.9 |
| Example 12 | Production example 14 | 0.2 | 0.1 | — | 0.2 | 30.3 |
| Comparative example 1 | Production example 9 | 0.2 | 0.1 | — | 0.2 | 16.2 |
| Comparative example 2 | Production example 9 | 0.2 | 0.1 | 100 | 0.2 | 13.5 |
| Comparative example 3 | Production example 1 | 0.2 | — | — | 0.2 | 30.7 |
| Comparative example 4 | Production example 12 | 0.2 | 0.1 | — | 0.2 | 30.4 |
| Comparative example 5 | Production example 13 | 0.2 | 0.1 | — | 0.2 | 31.1 |

TABLE 3-continued

| | Evaluation of adhesive sheet | | | | |
|---|---|---|---|---|---|
| | Adhesion | Durability | | | Ability to prevent light leakage |
| | (N/25 mm) | 85° C. DRY | 60° C./95% | Reworkability | |
| Example 1 | 9.3 | AA | AA | AA | AA |
| Example 2 | 9.2 | AA | BB | AA | AA |
| Example 3 | 9.1 | AA | AA | AA | AA |
| Example 4 | 10.5 | AA | AA | AA | AA |
| Example 5 | 12.3 | AA | AA | BB | AA |
| Example 6 | 8.1 | AA | AA | AA | BB |
| Example 7 | 9.4 | AA | AA | AA | AA |
| Example 8 | 9.0 | AA | AA | AA | AA |
| Example 9 | 9.2 | AA | AA | AA | AA |
| Example 10 | 8.8 | AA | AA | BB | AA |
| Example 11 | 9.9 | AA | AA | AA | AA |
| Example 12 | 10.4 | BB | AA | BB | BB |
| Comparative example 1 | Not applicable | — | — | — | — |
| Comparative example 2 | 6.4 | CC | CC | BB | BB |
| Comparative example 3 | 13.4 | CC | BB | CC | BB |
| Comparative example 4 | Not applicable | — | — | — | — |
| Comparative example 5 | 13.3 | CC | AA | BB | AA |

*[2] The values of components are expressed in parts by weight.
*[3] The amount of each (meth)acrylic polymer of Production Examples 1 to 14 is 100 parts by weight.
*[4] U-340A is dibutyltin bisisononyl-3-mercaptopropionate manufactured by Nitto Kasei Co., Ltd.

Example 13

An adhesive composition for polarizing plates was prepared by, to 100 parts by weight of the (meth)acrylic polymer (a) prepared in Production Example B-1, adding 0.30 parts by weight (0.225% by weight based on the solid content of the (meth)acrylic polymer) of an isocyanate cross-linker (TD-75), 0.1 part by weight (0.1% by weight based on the solid content of the (meth)acrylic polymer) of a cross-linking accelerator Neostann U-340A and 0.4 parts by weight (0.2% by weight based on the solid content of the (meth)acrylic polymer) of a silane coupling agent (A-50).

The resulting adhesive composition for polarizing plates was applied with a comma coater to a releasable surface of a release liner (MRF38), and was dried at a temperature of 90° C. for 180 seconds in a hot-air dryer (manufactured by Isuzu Seisakusho Co., Ltd.) set at an air volume of 10 m³/min. A polarizing plate was bonded to the resulting adhesive layer having a thickness of 25 μm at a nip pressure of 150 N/cm to fabricate a roll of polarizing plate having an adhesive layer.

In this example, the polarizing plate had a three-layer structure composed of cellulose triacetate films bonded on both faces of a polyvinyl alcohol film on which iodine was adsorbed and oriented, and had a total thickness of 180 μm.

Example 14

A polarizing plate having an adhesive layer was fabricated in the same way as in Example 13 except that the (meth)acrylic polymer prepared in Production Example B-1 was substituted by the (meth)acrylic polymer prepared in Production Example B-2.

Example 15

A polarizing plate having an adhesive layer was fabricated in the same way as in Example 13 except that the (meth)acrylic polymer prepared in Production Example B-1 was substituted by the (meth)acrylic polymer prepared in Production Example B-3.

A (meth)acrylic polymer solution used in this example was prepared in Production Example B-3. A solution containing 30% by weight (meth)acrylic polymer in 70% by weight ethyl acetate had a viscosity of 8.8 Pa·s measured at 23° C.

Example 16

A polarizing plate having an adhesive layer was fabricated in the same way as in Example 13 except that the cross-linking accelerator composed of an organic tin containing compound (Neostann U-340A) was substituted by a zinc cross-linking accelerator (zinc oxide (one type), manufactured by The Honjo Chemical Co.).

Example 17

A polarizing plate composition prepared using the same compound as in Example 13 was applied with a comma coater to a releasable surface of a release film of a middle release grade (Cerapeel MT (#38), manufactured by Toray Advanced Film Co., Ltd.), and was dried at a temperature of 90° C. for 80 seconds in a hot-air dryer (manufactured by Isuzu Seisakusho Co., Ltd.) set at an air volume of 10 m³/min. A releasable surface of a release film of a light release grade (Cerapeel MD (#38), manufactured by Toray Advanced Film Co., Ltd.) was bonded to the resulting adhesive layer having a thickness of 25 μm at a nip pressure of 150 N/cm. The polarizing plate having an adhesive layer was wound into an adhesive roll having no substrate.

Example 18

A roll of polarizing plate having an adhesive layer fabricated in Example 13 was immediately transferred and stored in an environment testing room set at 5° C.

Comparative Example 6

A polarizing plate having an adhesive layer was fabricated in the same way as in Example 13 except that the (meth)acrylic polymer prepared in Production Example B-4 was used.

Comparative Example 7

A polarizing plate having an adhesive layer was fabricated in the same way as in Example 13 except that the (meth)acrylic polymer prepared in Production Example B-5 was used.

Comparative Example 8

A polarizing plate having an adhesive layer was fabricated in the same way as in Example 13 except that the isocyanate cross-linker was substituted by an epoxy cross-linker (E-5XM, manufactured by Soken Chemical & Engineering Co., Ltd.).

Comparative Example 9

A polarizing plate having an adhesive layer was fabricated in the same way as in Example 13 except that the cross-linking accelerator U-340A was not added.

Comparative Example 10

A polarizing plate having an adhesive layer was fabricated in the same way as in Example 13 except that the cross-linking accelerator (U-340A) was not added and that the amount of isocyanate cross-linker (TD-75) was increased to 0.6 parts by weight (0.45% by weight based on the solid content of a (meth)acrylic polymer).

Comparative Example 11

A polarizing plate having an adhesive layer was fabricated in the same way as in Example 13 except that the cross-linking accelerator was substituted by an amine cross-linking accelerator (triethylamine, manufactured by Tokyo Chemical Industry Co., Ltd.).

In a polarizing plate having an adhesive according to the present invention, a method for measuring the gel fraction involved applying an adhesive to a release film (MRF38, or Cerapeel MT (#38) only for Example 5) instead of a polarizing plate and measuring the gel fraction after coating (after a predetermined period of time).

In the measuring method, the release film was cut into 50 mm×50 mm, the adhesive was scraped from the release film, and the initial weight of the adhesive was measured. The adhesive was immersed in 50 g of ethyl acetate and was left to stand at room temperature for 24 hours. After filtration with a 200-mesh stainless wire net, a residue on the mesh was dried at 90° C. for 3 hours and was weighed. The gel fraction was calculated from the initial weight and the weight of the residue by the following equation.

Gel fraction(%)=100×(weight of residue)/(initial weight)

Table 4 shows the evaluation of the adhesive compositions prepared in Examples 13 to 18 and Comparative Examples 6 to 11.

TABLE 4

| | Production example of composition | Acrylic polymer | Cross-linking agent | | Cross-linking accelerator | | Silane coupling agent | |
|---|---|---|---|---|---|---|---|---|
| | | | Isocyanate*[4] | Part(s) by weight | Type | Part(s) by weight | Type | Part(s) by weight |
| Example 13 | B-1 | 100 | TD-75 | 0.30 | U-340A*[6] | 0.1 | A-50 | 0.4 |
| Example 14 | B-2 | 100 | TD-75 | 0.30 | U-340A | 0.1 | A-50 | 0.4 |
| Example 15 | B-3 | 100 | TD-75 | 0.30 | U-340A | 0.1 | A-50 | 0.4 |
| Example 16 | B-1 | 100 | TD-75 | 0.30 | zinc oxide | 0.1 | A-50 | 0.4 |
| Example 17 | B-1 | 100 | TD-5 | 0.3 | Tin compound*[8] | 0.1 | A-50 | 0.4 |
| Example 18*[7] | B-1 | 100 | TD-75 | 0.30 | U-340A | 0.1 | A-50 | 0.4 |
| Comparative example 6 | B-4 | 100 | TD-75 | 0.30 | U-340A | 0.1 | A-50 | 0.4 |
| Comparative example 7 | B-5 | 100 | TD-75 | 0.30 | U-340A | 0.1 | A-50 | 0.4 |
| Comparative example 8 | B-1 | 100 | Epoxy resin*[5] | 0.30 | U-340A | 0.1 | A-50 | 0.4 |
| Comparative example 9 | B-1 | 100 | TD-75 | 0.30 | None | 0 | A-50 | 0.4 |
| Comparative example 10 | B-1 | 100 | TD-75 | 0.6 (0.45) | None | 0.1 | A-50 | 0.4 |
| Comparative example 11 | B-1 | 100 | TD-75 | 0.30 | Triethylamine | 0.1 | A-50 | 0.4 |

Note)
*[4] is an isocyanate cross-linker (trade name: TD-75) manufactured by Soken Chemical & Engineering Co., Ltd.
*[5] is an epoxy cross-linker (trade name: E-5XM) manufactured by Soken Chemical & Engineering Co., Ltd.
A curing accelerator U-340A represented by *[6] is dioctyltin bisnonyl-3-mercaptopropionate (trade name: Neostann U-340A, manufactured by Nitto Kasei Co., Ltd.), which is a compound represented by a structure expressed by the formula [II-2].
*[7] is the roll of polarizing plate having an adhesive fabricated in Example 1, immediately transferred and stored in an environment testing room set at 5° C.
A tin compound represented by *[8] is dimethyltin bisisooctylthioglycol.

TABLE 5

|  |  | After 10 hours | After 24 hours | After 3 days | After 7 days | After 30 days |
|---|---|---|---|---|---|---|
| Example 13 | Heat resistance | AAAA | AAAA | AAAA | AAAA | AAAA |
|  | Humidity and heat resistance | AAAA | AAAA | AAAA | AAAA | AAAA |
|  | Reworkability | BBBB | AAAA | AAAA | AAAA | AAAA |
|  | Ability to prevent light leakage | BBBB | BBBB | BBBB | BBBB | BBBB |
|  | Adhesion | 7.2 N/mm | 6.8 N/mm | 5 N/mm | 5 N/mm | 4.8 N/mm |
|  | Gel fraction | 67.2% | 68.1% | 72.6% | 71.8% | 73.2% |
| Example 14 | Heat resistance | AAAA | AAAA | AAAA | AAAA | AAAA |
|  | Humidity and heat resistance | AAAA | AAAA | AAAA | AAAA | AAAA |
|  | Reworkability | BBBB | AAAA | AAAA | AAAA | AAAA |
|  | Ability to prevent light leakage | AAAA | AAAA | AAAA | AAAA | AAAA |
|  | Adhesion | 10.8 N/mm | 9.6 N/mm | 9.2 N/mm | 9.3 N/mm | 9.1 N/mm |
|  | Gel fraction | 62.1% | 64.2% | 65.1% | 64.9% | 65.3% |
| Example 15 | Heat resistance | AAAA | AAAA | AAAA | AAAA | AAAA |
|  | Humidity and heat resistance | SSSS | SSSS | SSSS | SSSS | SSSS |
|  | Reworkability | BBBB | BBBB | AAAA | AAAA | AAAA |
|  | Ability to prevent light leakage | BBBB | BBBB | BBBB | BBBB | BBBB |
|  | Adhesion | 8.4 N/mm | 6.8 N/mm | 5 N/mm | <5 N/mm | 4.8 N/mm |
|  | Gel fraction | 67.2% | 68.4% | 72.6% | 71.8% | 73.2% |
| Example 16 | Heat resistance | AAAA | AAAA | AAAA | AAAA | AAAA |
|  | Humidity and heat resistance | AAAA | AAAA | AAAA | AAAA | AAAA |
|  | Reworkability | BBBB | AAAA | AAAA | AAAA | AAAA |
|  | Ability to prevent light leakage | BBBB | BBBB | BBBB | BBBB | BBBB |
|  | Adhesion | 8.4 N/mm | 7.8 N/mm | 7.2 N/mm | 7.3 N/mm | 7.1 N/mm |
|  | Gel fraction | 65.3% | 66.9% | 67.5% | 67.8% | 67.8% |
| Example 17 | Heat resistance | — | AAAA | AAAA | AAAA | AAAA |
|  | Humidity and heat resistance | — | AAAA | AAAA | AAAA | AAAA |
|  | Reworkability | — | AAAA | AAAA | AAAA | AAAA |
|  | Ability to prevent light leakage | — | BBBB | BBBB | BBBB | BBBB |
|  | Adhesion | — | 6.8 N/mm | 5.2 N/mm | 5.2 N/mm | 5.3 N/mm |
|  | Gel fraction | 67.2% | 68.1% | 71.3% | 70.2% | 71.2% |
| Example 18 | Heat resistance | — | AAAA | AAAA | AAAA | AAAA |
|  | Humidity and heat resistance | — | AAAA | AAAA | AAAA | AAAA |
|  | Reworkability | — | AAAA | AAAA | AAAA | AAAA |
|  | Ability to prevent light leakage | — | BBBB | BBBB | BBBB | BBBB |
|  | Adhesion | — | 7.2 N/mm | 5.8 N/mm | 5.6 N/mm | 5.6 N/mm |
|  | Gel fraction | 65.1% | 66.9% | 70.1% | 71.8% | 71.9% |

TABLE 6

|  |  | After 10 hours | After 24 hours | After 3 days | After 7 days | After 30 days |
|---|---|---|---|---|---|---|
| Comparative example 6 | Heat resistance | DDDD | DDDD | DDDD | DDDD | DDDD |
|  | Humidity and heat resistance | BBBB | BBBB | BBBB | BBBB | BBBB |
|  | Reworkability | CCCC | CCCC | CCCC | CCCC | CCCC |
|  | Ability to prevent light leakage | BBBB | BBBB | BBBB | BBBB | BBBB |
|  | Adhesion | 12.5 N/mm | 11.2 N/mm | 10.8 N/mm | 11.1 N/mm | 10.9 N/mm |
|  | Gel fraction | 43.5% | 46.5% | 48.2% | 48.3% | 49.5% |
| Comparative example 7 | Heat resistance | AAAA | AAAA | AAAA | AAAA | AAAA |
|  | Humidity and heat resistance | CCCC | DDDD | DDDD | DDDD | DDDD |
|  | Reworkability | AAAA | AAAA | AAAA | AAAA | AAAA |
|  | Ability to prevent light leakage | DDDD | DDDD | DDDD | DDDD | DDDD |
|  | Adhesion | 6.1 N/mm | 5.4 N/mm | 4.8 N/mm | 4.6 N/mm | 4.6 N/mm |
|  | Gel fraction | 69.5% | 72.1% | 74.6% | 74.8% | 74.4% |
| Comparative example 8 | Heat resistance | DDDD | DDDD | DDDD | DDDD | DDDD |
|  | Humidity and heat resistance | DDDD | DDDD | DDDD | DDDD | DDDD |
|  | Reworkability | DDDD | DDDD | DDDD | DDDD | DDDD |
|  | Ability to prevent light leakage | BBBB | BBBB | BBBB | BBBB | BBBB |
|  | Adhesion | 15.5 N/mm | 15.1 N/mm | 45.8 N/mm | 15.2 N/mm | 14.5 N/mm |
|  | Gel fraction | 3.5% | 5.2% | 5.5% | 6.8% | 10.2% |
| Comparative example 9 | Heat resistance | DDDD | DDDD | DDDD | DDDD | DDDD |
|  | Humidity and heat resistance | BBBB | BBBB | BBBB | BBBB | BBBB |
|  | Reworkability | CCCC | CCCC | CCCC | CCCC | CCCC |
|  | Ability to prevent light leakage | AAAA | BBBB | BBBB | BBBB | BBBB |
|  | Adhesion | 12.5 N/mm | 11.9 N/mm | 9.6 N/mm | 8.7 N/mm | 8.3 N/mm |
|  | Gel fraction | 0% | 0% | 38.5% | 48.2% | 47.6% |
| Comparative example 10 | Heat resistance | DDDD | DDDD | DDDD | BBBB | BBBB |
|  | Humidity and heat resistance | CCCC | BBBB | BBBB | BBBB | BBBB |

TABLE 6-continued

|  |  | After 10 hours | After 24 hours | After 3 days | After 7 days | After 30 days |
|---|---|---|---|---|---|---|
|  | Reworkability | CCCC | CCCC | CCCC | CCCC | CCCC |
|  | Ability to prevent light leakage | AAAA | AAAA | AAAA | AAAA | AAAA |
|  | Adhesion | 12.5 N/mm | 11.9 N/mm | 9.7 N/mm | 8.7 N/mm | 8.3 N/mm |
|  | Gel fraction | 0% | 0% | 38.3% | 48.2% | 47.6% |
| Comparative example 11 | Heat resistance | DDDD | DDDD | BBBB | BBBB | BBBB |
|  | Humidity and heat resistance | BBBB | BBBB | BBBB | BBBB | BBBB |
|  | Reworkability | CCCC | CCCC | CCCC | CCCC | CCCC |
|  | Ability to prevent light leakage | BBBB | BBBB | BBBB | BBBB | BBBB |
|  | Adhesion | 13.8 N/mm | 10.8 N/mm | 9.8 N/mm | 8.6 N/mm | 8.3 N/mm |
|  | Gel fraction | 0% | 32.5% | 58.2% | 65.1% | 65.2% |

Note)
Ratings of characteristics shown in Tables 5 and 6 described above are as follows:
"SSSS" indicates having the best performance as an adhesive composition for polarizing plates,
"AAAA" indicates having characteristics well-suited for an adhesive composition for polarizing plates,
"BBBB" indicates having characteristics suited for an adhesive composition for polarizing plates,
"CCCC" indicates that the application of the adhesive composition is limited, and
"DDDD" indicates that the characteristics of the adhesive composition are unsuitable for an adhesive composition for polarizing plates.

An adhesive composition for polarizing plates according to the present invention contains large amounts of active components such as a resin that form an adhesive layer. Although the adhesive composition contains a small amount of organic solvent, the adhesive composition has a low viscosity such that an adhesive layer having a suitable thickness as an adhesive for polarizing plates can be formed. Furthermore, because of a small amount of organic solvent and use of a suitable cross-linking accelerator, a three-dimensional crosslinked structure between an acrylic polymer and a cross-linker is rapidly formed.

Furthermore, an adhesive composition for polarizing plates according to the present invention has high heat resistance and humidity and heat resistance. Even in long-term use in liquid crystal displays, therefore, failures of a polarizing plate such as detachment and swelling rarely occur. In addition, the adhesive composition for polarizing plates according to the present invention has a high ability to prevent light leakage. While the adhesive composition for polarizing plates according to the present invention has adhesiveness suitable to attach a polarizing plate to a glass substrate, the adhesive composition has excellent reworkability. Even if a polarizing plate is inappropriately fixed, the polarizing plate can be removed without damaging a glass substrate such as a liquid crystal display.

The invention claimed is:

1. An adhesive composition for polarizing plates, in which a (meth)acrylic polymer, a cross-linker, and a cross-linking accelerator are dissolved in an organic solvent, the (meth)acrylic polymer being formed by copolymerization of monomers containing an alkyl (meth)acrylate, a hydroxyl group containing monomer, and/or a carboxyl group containing monomer,
wherein a solution containing 30% by weight of (meth)acrylic polymer which constitutes the adhesive composition, dissolved in 70% by weight of ethyl acetate has a viscosity in the range of 0.5 to 10.0 Pa·s measured at 23° C., the (meth)acrylic polymer having a weight-average molecular weight in the range of 300,000 to 900,000 is crosslinked with an isocyanate cross-linker in the presence of the cross-linking accelerator, and
the adhesive composition for polarizing plates contains 25 to 60% by weight of non-volatile matter.

2. The adhesive composition for polarizing plates according to claim 1, wherein the adhesive composition for polarizing plates is an adhesive composition in which an acrylic polymer, an organic tin compound serving as a cross-linking accelerator, and an isocyanate cross-linker are dissolved in an organic solvent, the acrylic polymer being formed by copolymerization of monomers containing an alkyl (meth)acrylate, a hydroxyl group containing monomer, and/or a carboxyl group containing monomer,
wherein a solution containing 30% by weight of acrylic polymer which constitutes the adhesive composition, dissolved in 70% by weight of ethyl acetate has a viscosity in the range of 0.5 to 10.0 Pa·s measured at 23° C., the acrylic polymer has a weight-average molecular weight in the range of 300,000 to 700,000, and temporal changes in the gel faction of an adhesive forming an adhesive layer formed by the application of the adhesive composition satisfy the following conditions:
(a) the gel fraction 10 hours after the formation of the adhesive layer is 30% or more,
(b) the difference in gel fraction between 10 hours and three days after the formation of the adhesive layer is 15% or less, and
(c) the difference in gel fraction between 24 hours and 30 days after the formation of the adhesive layer is 5% or less.

3. The adhesive composition for polarizing plates according to claim 1, wherein the (meth)acrylic polymer is a copolymer formed by copolymerization between 90 to 99.95% by weight of (meth)acrylate monomer and 0.05 to 10% by weight of hydroxyl group containing monomer and/or carboxyl group containing monomer in the presence of 0.015 to 0.12 parts by weight of an alkoxysilyl group containing thiol compound based on 100 parts by weight of the (meth)acrylate monomer, the hydroxyl group containing monomer and the carboxyl group containing monomer in total.

4. The adhesive composition for polarizing plates according to claim 1, wherein the (meth)acrylic polymer is further copolymerized with a benzene ring containing monomer and/or a silyl group containing monomer.

5. The adhesive composition for polarizing plates according to claim 1, wherein the adhesive composition for polarizing plates comprises 0.01 to 0.5 parts by weight of the cross-linker and 0.01 to 0.5 parts by weight of the cross-linking accelerator based on 100 parts by weight of the (meth)acrylic polymer.

6. The adhesive composition for polarizing plates according to claim 1, wherein the adhesive for polarizing plates further comprises a silane coupling agent.

7. The adhesive composition for polarizing plates according to claim 1, wherein the weight-average molecular weight of the (meth)acrylic polymer is controlled with a sulfur-containing hydrocarbon compound.

8. The adhesive composition for polarizing plates according to claim 1, wherein the cross-linking accelerator is a tin-containing compound having a dialkyl group.

9. The adhesive for polarizing plates according to claim 8, wherein the tin compound having a dialkyl group serving as the cross-linking accelerator contains a sulfur atom in the molecule.

10. The adhesive composition for polarizing plates according to claim 1, wherein the gel fraction of an adhesive forming an adhesive layer 10 hours after the formation of the adhesive layer is 30% or more.

11. A polarizing plate having an adhesive layer formed from an adhesive composition in which a (meth)acrylic polymer, a cross-linker, and a cross-linking accelerator are dissolved in an organic solvent, the (meth)acrylic polymer being formed by copolymerization of monomers containing an alkyl (meth)acrylate, a hydroxyl group containing monomer and/or a carboxyl group containing monomer, wherein a solution containing 30% by weight of the (meth)acrylic polymer which constitutes the adhesive composition, dissolved in 70% by weight of ethyl acetate has a viscosity in the range of 0.5 to 10.0 Pa·s measured at 23° C., the (meth)acrylic polymer having a weight-average molecular weight in the range of 300,000 to 900,000 is crosslinked with an isocyanate cross-linker in the presence of the cross-linking accelerator, the adhesive composition contains 25 to 60% by weight of non-volatile matter, and the adhesive layer is formed on at least one side of the polarizing plate.

12. The polarizing plate having an adhesive layer according to claim 11, wherein the adhesive composition is an adhesive composition in which an acrylic polymer, a tin compound having a dialkyl group and serving as a cross-linking accelerator, and an isocyanate cross-linker are dissolved in an organic solvent, the acrylic polymer being formed by copolymerization of monomers containing an alkyl (meth)acrylate, a hydroxyl group containing monomer and/or a carboxyl group containing monomer, a solution containing 30% by weight of the acrylic polymer which constitutes the adhesive composition, dissolved in 70% by weight of ethyl acetate has a viscosity in the range of 0.5 to 10.0 Pa·s measured at 23° C., the acrylic polymer has a weight-average molecular weight in the range of 300,000 to 700,000, and an adhesive layer is formed on at least one side of the polarizing plate in which temporal changes in the gel fraction of an adhesive forming the adhesive layer formed by the application of the adhesive composition satisfy the following conditions:

(a) the gel fraction 10 hours after the formation of the adhesive layer is 30% or more, (b) the difference in gel fraction between 10 hours and three days after the formation of the adhesive layer is 15% or less, and (c) the difference in gel fraction between 24 hours and 30 days after the formation of the adhesive layer is 5% or less.

13. The adhesive composition for polarizing plates according to claim 11, wherein the (meth)acrylic polymer is further copolymerized with a benzene ring containing monomer and/or a silyl group containing monomer.

14. The polarizing plate having an adhesive layer according to claim 11, wherein the adhesive layer has an average thickness in the range of 10 to 50 μm.

15. The adhesive composition for polarizing plates according to claim 2, wherein the (meth)acrylic polymer is a copolymer formed by copolymerization between 90 to 99.95% by weight of (meth)acrylate monomer and 0.05 to 10% by weight of hydroxyl group containing monomer and/or carboxyl group containing monomer in the presence of 0.015 to 0.12 parts by weight of an alkoxysilyl group containing thiol compound based on 100 parts by weight of the (meth)acrylate monomer, the hydroxyl group containing monomer and the carboxyl group containing monomer in total.

16. The adhesive composition for polarizing plates according to claim 2, wherein the (meth)acrylic polymer is further copolymerized with a benzene ring containing monomer and/or a silyl group containing monomer.

17. The adhesive composition for polarizing plates according to claim 2, wherein the adhesive composition for polarizing plates comprises 0.01 to 0.5 parts by weight of the cross-linker and 0.01 to 0.5 parts by weight of the cross-linking accelerator based on 100 parts by weight of the (meth)acrylic polymer.

18. The adhesive composition for polarizing plates according to claim 2, wherein the adhesive for polarizing plates further comprises a silane coupling agent.

19. The adhesive composition for polarizing plates according to claim 2, wherein the weight-average molecular weight of the (meth)acrylic polymer is controlled with a sulfur-containing hydrocarbon compound.

20. The adhesive composition for polarizing plates according to claim 2, wherein the cross-linking accelerator is a tin-containing compound having a dialkyl group.

21. The adhesive composition for polarizing plates according to claim 2, wherein the gel fraction of an adhesive forming an adhesive layer 10 hours after the formation of the adhesive layer is 30% or more.

22. The adhesive composition for polarizing plates according to claim 12, wherein the (meth)acrylic polymer is further copolymerized with a benzene ring containing monomer and/or a silyl group containing monomer.

23. The polarizing plate having an adhesive layer according to claim 12, wherein the adhesive layer has an average thickness in the range of 10 to 50 μm.

* * * * *

UNITED STATES PATENT AND TRADEMARK OFFICE
CERTIFICATE OF CORRECTION

PATENT NO. : 8,188,194 B2  
APPLICATION NO. : 12/668301  
DATED : May 29, 2012  
INVENTOR(S) : Tetsuya Yoshida et al.

Page 1 of 1

It is certified that error appears in the above-identified patent and that said Letters Patent is hereby corrected as shown below:

Column 40, Line 34, Claim 2, delete "faction" and insert -- fraction --

Signed and Sealed this  
Eleventh Day of September, 2012

David J. Kappos  
*Director of the United States Patent and Trademark Office*